(12) United States Patent
Strand et al.

(10) Patent No.: US 11,543,550 B2
(45) Date of Patent: Jan. 3, 2023

(54) INFILL MONITORING USING THE THREE-DIMENSIONAL FRESNEL ZONE OF A MIGRATION OPERATOR

(71) Applicant: PGS Geophysical AS, Oslo (NO)

(72) Inventors: Christian Wilhelm Strand, Weybridge (GB); Peter Ward, Weybridge (GB)

(73) Assignee: PGS GEOPHYSICAL AS, Oslo (NO)

( * ) Notice: Subject to any disclaimer, the term of this patent is extended or adjusted under 35 U.S.C. 154(b) by 0 days.

(21) Appl. No.: 16/930,202

(22) Filed: Jul. 15, 2020

(65) Prior Publication Data

US 2021/0055437 A1 Feb. 25, 2021

Related U.S. Application Data

(60) Provisional application No. 62/889,401, filed on Aug. 20, 2019.

(51) Int. Cl.
*G01V 1/30* (2006.01)
*G01V 1/38* (2006.01)

(52) U.S. Cl.
CPC ............ *G01V 1/30* (2013.01); *G01V 1/306* (2013.01); *G01V 1/3808* (2013.01); *G01V 2210/61* (2013.01); *G01V 2210/70* (2013.01); *G01V 2210/74* (2013.01)

(58) Field of Classification Search
CPC .... G01V 1/30; G01V 1/3808; G01V 2210/61; G01V 2210/70; G01V 2210/74
See application file for complete search history.

(56) References Cited

U.S. PATENT DOCUMENTS

| | | | | |
|---|---|---|---|---|
| 6,470,276 B1* | 10/2002 | Lansley | .................. | G01V 1/28 702/16 |
| 6,484,100 B1* | 11/2002 | Zuurbier | .............. | G01V 1/3808 702/3 |
| 7,336,560 B2* | 2/2008 | Rekdal | ................. | G01V 1/3808 367/15 |
| 7,944,774 B2 | 5/2011 | Monk | | |
| 2004/0054477 A1* | 3/2004 | Bernitsas | ............. | G01V 1/3808 702/14 |
| 2006/0268662 A1 | 11/2006 | Rekdal | | |

OTHER PUBLICATIONS

Li, "Fresnel-based infill analysis and image quality" Master thesis, DUO Research Archive; available as early as Oct. 2017 at https://web.archive.org/web/20171025143124/https://www.duo.uio.no/handle/10852/12570 (Year: 2017).*

(Continued)

*Primary Examiner* — John C Kuan

(57) ABSTRACT

Implementations for monitoring seismic data recorded in a marine survey of a subterranean formation for coverage gaps are described herein. Implementations include computing Fresnel sum operators for Fresnel zones of the subterranean formation based on a Kirchhoff migration impulse response at horizons of a representative plane layer model of a survey area of the subterranean formation. Implementations also include computing an acceptability map of the survey area based on the Fresnel sum operators. The acceptability map reveals coverage gaps in the survey area. Geoscientist may use the acceptability map to infill seismic data in areas of the survey area that correspond to the coverage gaps.

36 Claims, 25 Drawing Sheets

(56) References Cited

OTHER PUBLICATIONS

Strand et al., "Evaluating infill requirements when acquiring a marine 3D seismic survey along pre-plot lines" SEG Las Vegas 2008 Annual Meeting (Year: 2008).*

Galler, Bernard A., and Fisher, Michael J., "An Improved Equivalence Algorithm," ACM National Conference, Denver, Colorado, vol. 7, No. 5, May 1964; pp. 301-303.

Kvasnicka, Michal and CERVENY, Vlastislav, "Analytical Expression for Fresnel volumes and Interface Fresnel Zones of Seismic Body Waves. Part 1: Direct and Unconverted Reflected Waves," Studia geoph. et geod. 40 (1996), pp. 136-155.

Kvasnicka, Michal and Cerveny, Vlastislav, "Analytical Expression for Fresnel Volumes and Interface Fresnel Zones of Seismic Body Waves. Part 2: Transmitted and Converted Waves. Head Waves," Studa geoph. et geod. 40 (1996) 381-397.

Day, A.J, and Rekdal, T., "P073, Determining Infill Specifications Based on Geophysical Criteria," Vienna 2006.

Strand, Christian et al., "Evaluating infill requirements when acquiring a marine 3D seismic survey along pre-plot lines," 2008 SEG Annual Meeting, Nov. 9-14, Las Vegas, NV.

Monk, David J., "Fresnel-zone binning: Fresnet-zone shape with offset and velocity function," Geophysics, vol. 75, No. 1 (Jan.-Feb. 2010) pp. T9-T14.

Monk, David J., "Fresnetl zone binning: Application to 3D seismic fold and coverage assessments," The Leading Edge, Mar. 2009.

Strand, "Barcelona '10," 72nd EAGE Conference & Exhibition incorporating SPE EUROPEC 2010, Barcelona, Spain, Jun. 14-17, 2010.

Monk, David J., "Reducing infill requirements using Fresnel zone binning and steerable streamers," 2010 SEG, SEG Denver 2010 Annual Meeting, pp. 3802-3806.

* cited by examiner

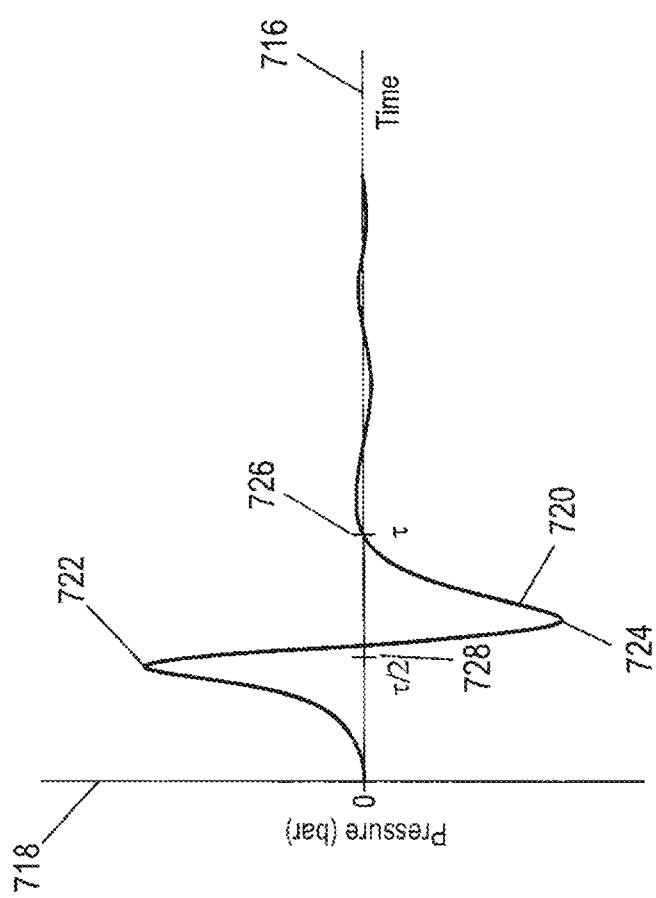

INFILL MONITORING USING THE THREE-DIMENSIONAL FRESNEL ZONE OF A MIGRATION OPERATOR

CROSS-REFERENCE TO A RELATED APPLICATION

This application claims the benefit of Provisional Application 62/889,401, filed Aug. 20, 2019, which application is hereby incorporated by reference as if entirely set forth herein.

BACKGROUND

Marine seismology companies invest heavily in the development of marine seismic surveying equipment and seismic data processing techniques to obtain accurate, high-resolution seismic images of subterranean formations located beneath a body of water. Such images may be used, for example, to reveal the geological structure of subterranean formations, to discover petroleum reservoirs, and to monitor petroleum reservoirs during production. A typical marine survey is carried out with one or more survey vessels that tow one or more seismic sources and numerous streamers through the body of water. The survey vessel contains seismic acquisition equipment, such as navigation control, seismic source control, seismic receiver control, and recording equipment. The seismic source control controls activation of the one or more seismic sources at selected times or locations. A seismic source typically comprises an array of source elements, such as air guns, that are activated to produce an acoustic impulse. The acoustic impulse is a sound wave that spreads out in all directions. A portion of the impulse that travels down through the water and into a subterranean formation propagates as a sound wave within the subterranean formation. At each interface between different types of rock and sediment, a portion of the sound wave is refracted, a portion is transmitted, and another portion is reflected into the body of water to propagate toward the water surface. The streamers are elongated cable-like structures that are towed behind a survey vessel in the inline direction and are typically arranged parallel to one another in the crossline direction. Each streamer contains seismic receivers or sensors that detect pressure and/or particle motion wavefields of the sound waves reflected into the water from the subterranean formation. The streamers collectively form a seismic data acquisition surface. Each receiver records the pressure and/or particle motion wavefields in a trace of seismic data. The recorded pressure and/or particle motion wavefields are processed to generate images of the subterranean formation, enabling geoscientist to identify potential hydrocarbon reservoirs that may be suitable for oil and gas extraction and to monitor hydrocarbon reservoirs under production.

DESCRIPTION OF THE DRAWINGS

FIG. 7C shows a plot of an example far-field signature of a source wavefield emitted from a source.

DETAILED DESCRIPTION

Figure 1A:
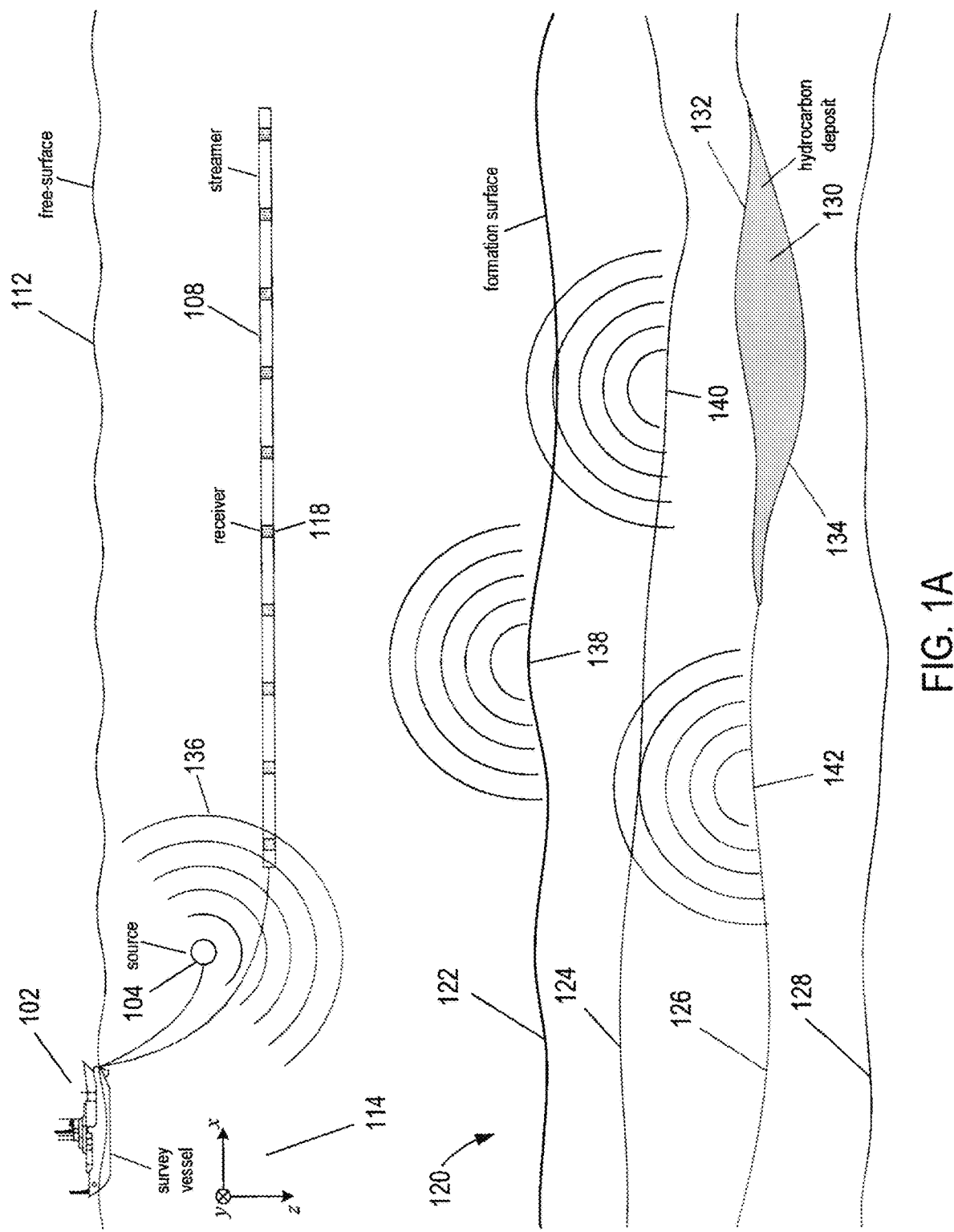
FIGS. 1A-1B show side elevation and top views, respectively, of an example seismic data acquisition system.

Seismic data is recorded over a survey area of a subterranean formation using a moving survey vessel that tows streamers in adjacent sail-lines. In an ideal marine survey, the sail lines are close together to avoid gaps or holes in seismic data recorded over the survey area. However, changing conditions during a marine survey can create coverage gaps in the seismic data. For example, changes in ocean currents, weather, or other environmental factors can cause the survey vessel and/or streamers to deviate from pre-planned and intended courses, leading to coverage gaps between sail-lines. Coverage gaps may include holes in the seismic data resulting from source or receiver malfunctions or low-quality traces that are discarded. Following completion of a marine survey, the recorded seismic data may be analyzed to determine coverage gaps that should be filled in by recording seismic data in additional sail-lines. These additional sail-lines are referred to as infill. Infill operations significantly increase the cost of the marine survey and delay processing and analysis of the recorded seismic data.

In an effort to reduce the high cost of infill, processes have been developed to distinguish between coverage gaps in need of infill from coverage gaps that are acceptable for data processing. In "Determining infill specifications based on geophysical criteria," 75th Annual SEG Meeting Expanded Abstracts, pp. 80-83, 2005, authors A. Day and T. Rekdal describe a method for assessing coverage gaps by outlining how coverage specifications for a subsurface can be related to geophysical criteria. U.S. Pat. No. 7,336,560, filed May 25, 2005, describes a method for infill modeling and monitoring based on migrating synthetic data with coverage gaps and calculating the effect on data quality of the coverage gaps. However, these and other conventional techniques for assessing the impact of coverage gaps on the quality of the recorded seismic data are calculated in two dimensions and are limited to the crossline direction.

This disclosure is directed to infill monitoring of subsurface coverage using the three-dimensional Fresnel zone of a migration operator. Infill monitoring may be performed at an onshore facility or onboard the survey vessel following seismic data acquisition using common midpoint ("CMP") fold maps. Infill monitoring uses a summation over the three-dimensional Fresnel zone of a migration operator and a modelled three-dimensional time migration response to transform a CMP fold map into an acceptability map. The acceptability map comprises a two-dimensional array of bins. Each bin corresponds to an area within a survey area covered by the marine survey and may be identified as an acceptable bin, a borderline bin, or an unacceptable bin. Unacceptable bins correspond to areas with insufficient recorded seismic data to produce a three-dimensional time migrated volume within approved decibel distortion thresholds. Geoscientist may use the acceptability map to more accurately identify coverage gaps in need of infill, thereby reducing the cost of the marine survey and reducing delays in processing recorded seismic data to identify hydrocarbon deposits in the subterranean formation.

Marine Seismic Surveying

Figure 1B:
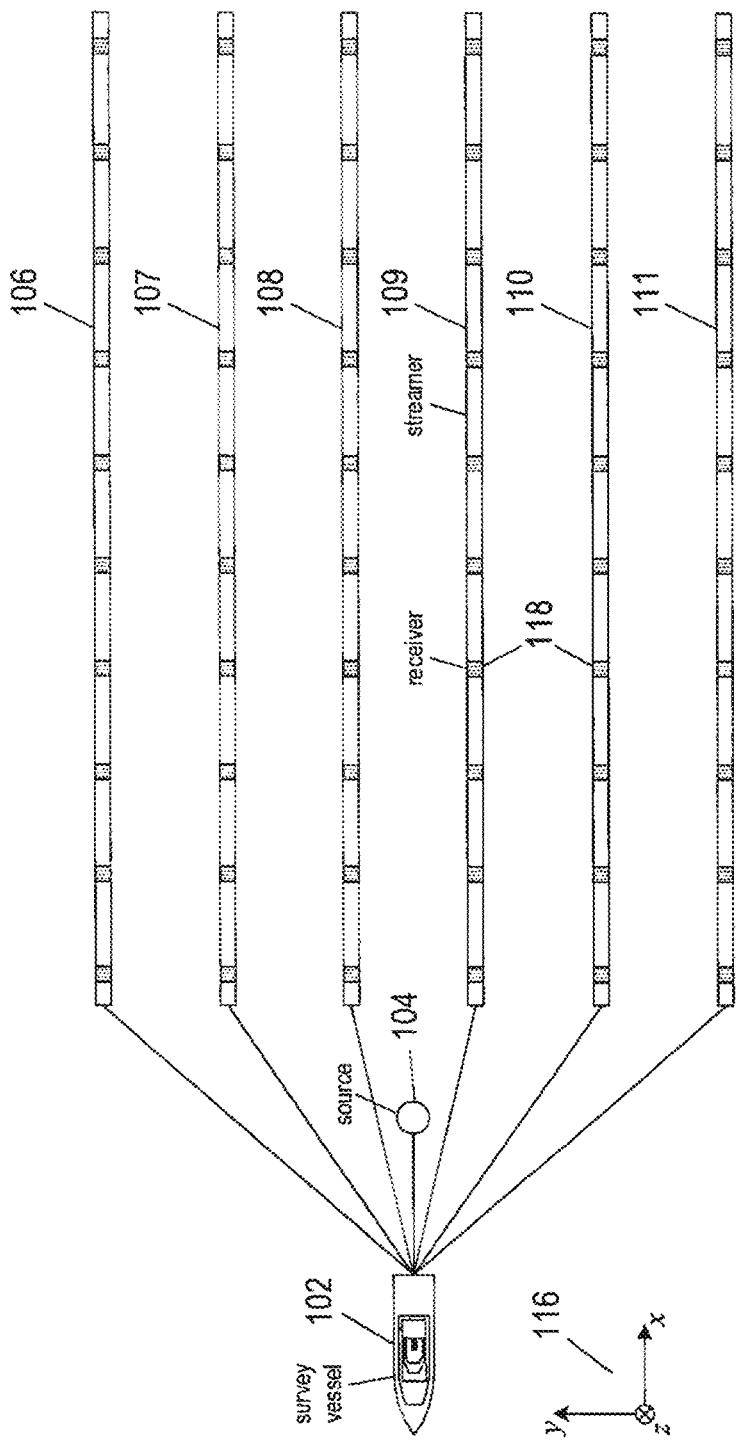

FIGS. 1A-1B show side elevation and top views, respectively, of an example seismic data acquisition system that includes a survey vessel 102 towing a multiple source array 104 and six separate streamers 106-111 beneath a free surface 112 of a body of water. The body of water can be, for example, an ocean, a sea, a lake, or a river, or any portion thereof. In this example, each streamer is attached at one end to the survey vessel 102 via a streamer-data-transmission cable. The illustrated streamers 106-111 form an ideally planar horizontal data acquisition surface with respect to the free surface 112. However, in practice, the data acquisition surface and streamers may be smoothly varying due to active sea currents and weather conditions. In other words, although the streamers 106-111 are illustrated in FIGS. 1A and 1B and subsequent figures as straight and substantially parallel to the free surface 112, in practice, the towed streamers may undulate because of dynamic conditions of the body of water in which the streamers are submerged. A data acquisition surface is not limited to having a planar horizontal orientation with respect to the free surface 112. The streamers may be towed at depths that angle the data acquisition surface with respect to the free surface 112 or one or more of the streamers may be towed at different depths. A data acquisition surface is not limited to six streamers as shown in FIG. 1B. In practice, the number of streamers used to form a data acquisition surface can range from as few as a single streamer to as many as 20 or more streamers.

FIG. 1A includes an xz-plane 114 and FIG. 1B includes an xy-plane 116 of the same Cartesian coordinate system having three orthogonal, spatial coordinate axes labeled x, y and z. The coordinate system is used to specify orientations and coordinate locations within a body of water. The x-direction specifies the position of a point in a direction parallel to the length of the streamers or to the direction the survey vessel is traveling and is referred to as the "in-line" direction. The y-direction specifies the position of a point in a direction perpendicular to the x-axis and substantially parallel to the free surface 112 and is referred to as the "cross-line" direction. The z-direction, also referred to as the "depth" direction, specifies the position of a point perpendicular to the xy-plane (i.e., perpendicular to the free surface 112) with the positive z-direction pointing downward away from the free surface 112. The streamers 106-111 are long cables containing power and data-transmission lines that connect receivers represented by shaded rectangles, such as receiver 118, spaced-apart along the length of each streamer to seismic acquisition equipment and data-storage devices located on board the survey vessel 102.

Streamer depth below the free surface 112 can be estimated at various locations along the streamers using depth-measuring devices attached to the streamers. For example, the depth-measuring devices can measure hydrostatic pressure or utilize acoustic distance measurements. The depth-measuring devices can be integrated with depth controllers, such as paravanes or water kites that control and maintain the depth and position of the streamers as the streamers are towed through the body of water. The depth-measuring devices are typically placed at intervals (e.g., about 300-meter intervals in some implementations) along each streamer. In other implementations buoys may be attached to the streamers and used to maintain the orientation and depth of the streamers below the free surface 112.

FIG. 1A shows the survey vessel 102 towing the source 104 above a subterranean formation 120. Curve 122, the formation surface, represents a top surface of the subterranean formation 120 located at the bottom of the body of water. The subterranean formation 120 may have subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by analysis of seismic data collected during a marine seismic survey. As the survey vessel 102 moves over the subterranean formation 120, the source 104 is activated (i.e., fired or shot) to produce an acoustic signal. In other implementations, the source 104 may be towed by one survey vessel and the streamers may be towed by a different survey vessel. FIG. 1A shows an acoustic signal expanding outward from the source 104 as a pressure wavefield 136 represented by semicircles of increasing radius centered at the source 104. The outwardly expanding wavefronts from the source may be spherical but are shown in vertical plane cross section in FIG. 1A. The outward and downward expanding portion of the pressure wavefield 136 and any portion of the pressure wavefield 136 reflected from the free-surface 112 are called the "source wavefield." The source wavefield eventually reaches the formation surface 122 of the subterranean formation 120, at which point the source wavefield may be partially reflected from the formation surface 122 and partially refracted downward into the subterranean formation 120, becoming elastic waves within the subterranean formation 120. In other words, in the body of water, the acoustic signal primarily comprises compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be a reflector or reflection point that becomes a potential secondary point source from which acoustic and elastic wave energy, respectively, may emanate upward toward the receivers 118 in response to the acoustic signal generated by the source 104 and downward-propagating elastic waves generated from the pressure impulse. As shown in FIG. 1A, waves of significant amplitude may be generally reflected from points on or close to the formation surface 122, such as reflection point 138, and from reflection points on or very close to interfaces in the subterranean formation 120, such as reflection points 140 and 142. The upward expanding waves reflected from the subterranean formation 120 are collectively the "reflected wavefield."

The waves that compose the reflected wavefield may be generally reflected at different times within a range of times following the initial source wavefield. A point on the formation surface 122, such as the reflection point 138, may receive a pressure disturbance from the source wavefield more quickly than a point within the subterranean formation 120, such as reflection points 140 and 142. Similarly, a reflection point on the formation surface 122 directly beneath the source 104 may receive the pressure disturbance sooner than a more distant-lying reflection point on the formation surface 122. Thus, the times at which waves are reflected from various reflection points within the subterranean formation 120 may be related to the distance, in three-dimensional space, of the reflection points from the activated source 104.

Acoustic and elastic waves may travel at different velocities within different materials as well as within the same material under different pressures. Therefore, the travel times of the source wavefield and reflected wavefield may be functions of distance from the source 104 as well as the materials and physical characteristics of the materials through which the wavefields travel. In addition, expanding wavefronts of the wavefields may be altered as the wavefronts cross interfaces and as the velocity of sound varies in the media traversed by the wavefront. The superposition of waves reflected from within the subterranean formation 120 in response to the source wavefield may be a generally complicated wavefield that includes information about the shapes, sizes, and material characteristics of the subterranean formation 120, including information about the shapes, sizes, and locations of the various reflecting features within the subterranean formation 120 of interest to exploration seismologists.

Each receiver 118 may be a multi-component sensor including particle motion sensors and a pressure sensor. A pressure sensor detects variations in water pressure over time. The term "particle motion sensor" refers to a sensor that may be configured to detect particle displacement, particle velocity, or particle acceleration over time. Each pressure sensor and particle motion sensor may include an analog-to-digital converter that converts time-dependent analog signals into discrete time series that consist of consecutively measured values called "amplitudes" separated in time by a sample rate. The time series data generated by a pressure or particle motion sensor is called a "trace," which may consist of thousands of samples collected at a typical sample rate of about 1 to 5 samples per millisecond. A trace is a recording of a subterranean formation response to acoustic energy that passes from an activated source and into the subterranean formation where a portion of the acoustic energy is reflected and/or refracted, and ultimately detected by a sensor. In general, each trace is an ordered set of discrete spatial and time-dependent pressure or particle motion sensor amplitudes denoted by:

$$tr(\vec{x}^s, \vec{x}^r, t) = \{A(\vec{x}^s, \vec{x}^r, t_j)\}_{j=1}^J \quad (1)$$

where
- tr represents a trace of pressure, particle displacement, particle velocity, or particle acceleration data;
- t represents time;
- $\vec{x}^r$ represents the Cartesian coordinates ($x^r$, $y^r$) of a receiver;
- $\vec{x}^s$ represents the Cartesian coordinates ($x^s$, $y^s$) of the source;
- A represents pressure, particle displacement, particle velocity, or particle acceleration amplitude;
- $t_j$ is the j-th sample time; and
- J is the number of time samples in the trace.

The coordinate location $\vec{x}^r$ of each receiver may be calculated from global position information obtained from one or more global positioning devices located along the streamers, survey vessel, and buoys and the known geometry and arrangement of the streamers and receivers. The coordinate location $\vec{x}^s$ of the source 104 may also be obtained from one or more global positioning devices located at each source and the know geometry and arrangement of source elements of the source 104. Each trace also includes a trace header not represented in Equation (1) that identifies the specific receiver that generated the trace, receiver and source GPS spatial coordinates, and may include time sample rate and the number of time samples.

Traces may be sorted according to different source and receiver locations and are collected to form "gathers" that can be further processed using various seismic data processing techniques to reveal the structure of the subterranean formation. The traces may be sorted into different domains such as a common-shot domain, common-receiver domain, common-receiver-station domain, and common-midpoint ("CMP") domain. A collection of traces sorted into the common-shot domain is called a common-shot gather. A collection of traces sorted into the common-receiver domain is called a common-receiver gather. A collection of traces sorted in the CMP domain is called a CMP gather.

Figure 2:
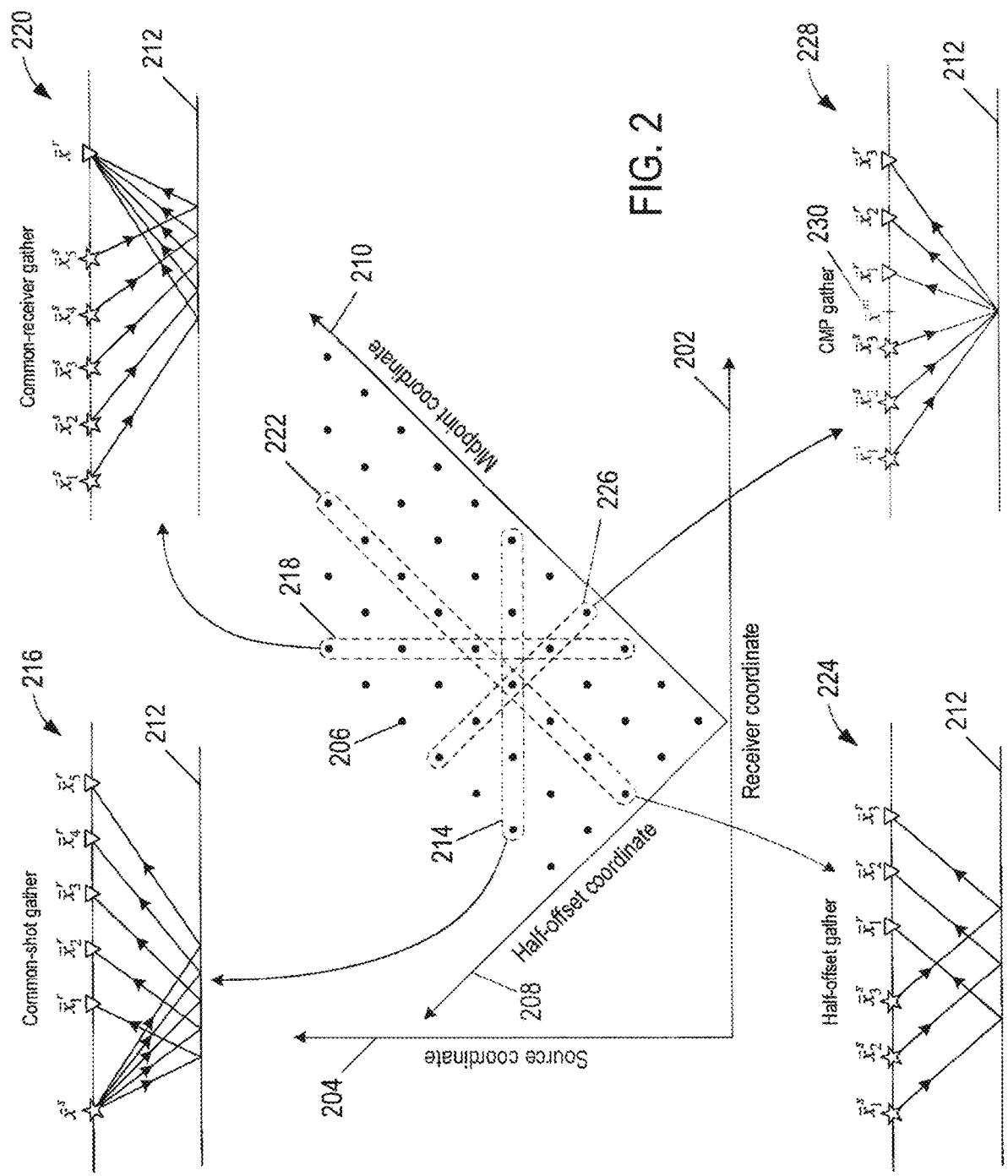
FIG. 2 shows various domains of seismic data recorded in a marine survey.

FIG. 2 shows various domains of seismic data recorded in a marine survey. Horizontal axis 202 represents receiver coordinate locations. Vertical axis 204 represents source coordinate locations. As explained above, seismic data is recorded in the source-receiver coordinate space ($\vec{x}^r$, $\vec{x}^s$). Each dot, such as dot 206, represents the location of a trace of seismic data with a receiver coordinate $\vec{x}^r$, a source coordinate $\vec{x}^s$, and a time axis (not shown) oriented perpendicular to the source/receiver plane. FIG. 2 includes axes 208 and 210 that represent a change to half-offset coordinates and midpoint coordinates, respectively. The half-offset and midpoint coordinate axes 208 and 210 are perpendicular to one another and oriented 45° with respect to the receiver coordinate axis 202. The half-offset coordinate transformation is given by $$\vec{x}^h = \frac{\vec{x}^r - \vec{x}^s}{2} \quad (2a)$$

and the midpoint coordinate transformation is given by $$\vec{x}^m = \frac{\vec{x}^r + \vec{x}^s}{2} \quad (2b)$$

Enclosed dots represent coordinate locations of traces of seismic data at the free surface sorted into one of four different domains. FIG. 2 includes four my-path diagrams with a hypothetical horizontal reflector 212 to aid in interpretation of the different domains. Enclosed traces 214 form a common-shot gather represented by ray-path diagram 216 that shows acoustic energy generated at one source location reaching receivers at different receiver locations and with different offsets. Enclosed traces 218 form a common-receiver gather represented by ray-path diagram 220 that shows acoustic energy generated at different source locations reflected to the same receiver location and with different offsets. Enclosed traces 222 form a half-offset gather represented by ray-path diagram 224 that shows acoustic energy generated at different source locations reflected to corresponding receivers with each receiver having the same offset from one of the sources. Enclosed traces 226 from a CMP gather represented by ray-path diagram 228 that shows acoustic energy generated at different source locations reflected from the same point of the reflector 212 to multiple receivers. The CMP 230 is a free surface coordinate location $\vec{x}^m$ located halfway between each pair of source and receiver locations.

A streamer spread is the crossline distance between the outermost streamers towed by a survey vessel. Marine surveys are typically designed so that sail lines are close enough together that steamer spreads overlap in regions between adjacent sail lines in order to avoid coverage gaps between sail lines. A CMP is the point on the free surface halfway between the location of the source and a receiver located in a streamer as described above with reference to FIG. 2. A line of CMPs, also called a CMP line, comprises a series of CMPs that extend in the inline direction for a moving source towed by a survey vessel and the receivers located along a particular streamer. As the survey vessel travels one of the sail lines half of the streamers cover the area between adjacent sail lines. As the survey vessel travels an adjacent sail line later in the marine survey, the half of the streamers cover the same area between the adjacent sail lines. However, changing conditions during a marine survey, such as changing ocean currents, weather, or other environmental factors, create coverage gaps between adjacent CMP lines which correspond to gaps in the recorded seismic data. Coverage gaps may also include CMP holes that correspond to holes in the recorded data created by defective traces of seismic data or receiver dropouts.

Figure 3A:
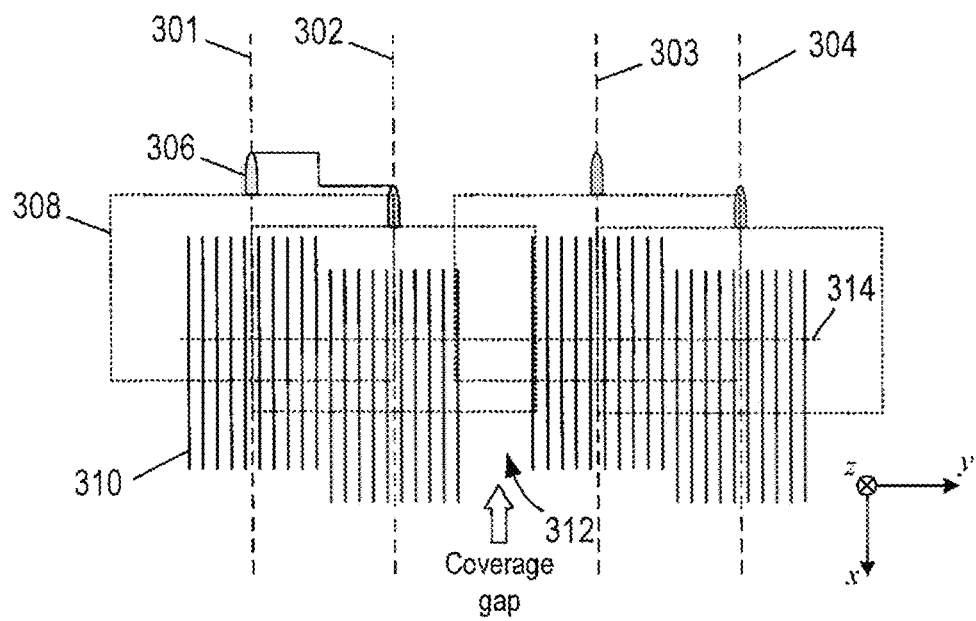
FIG. 3A shows an example of sail lines traveled by a survey vessel towing multiple streamers and a coverage gap.
Figure 3B:
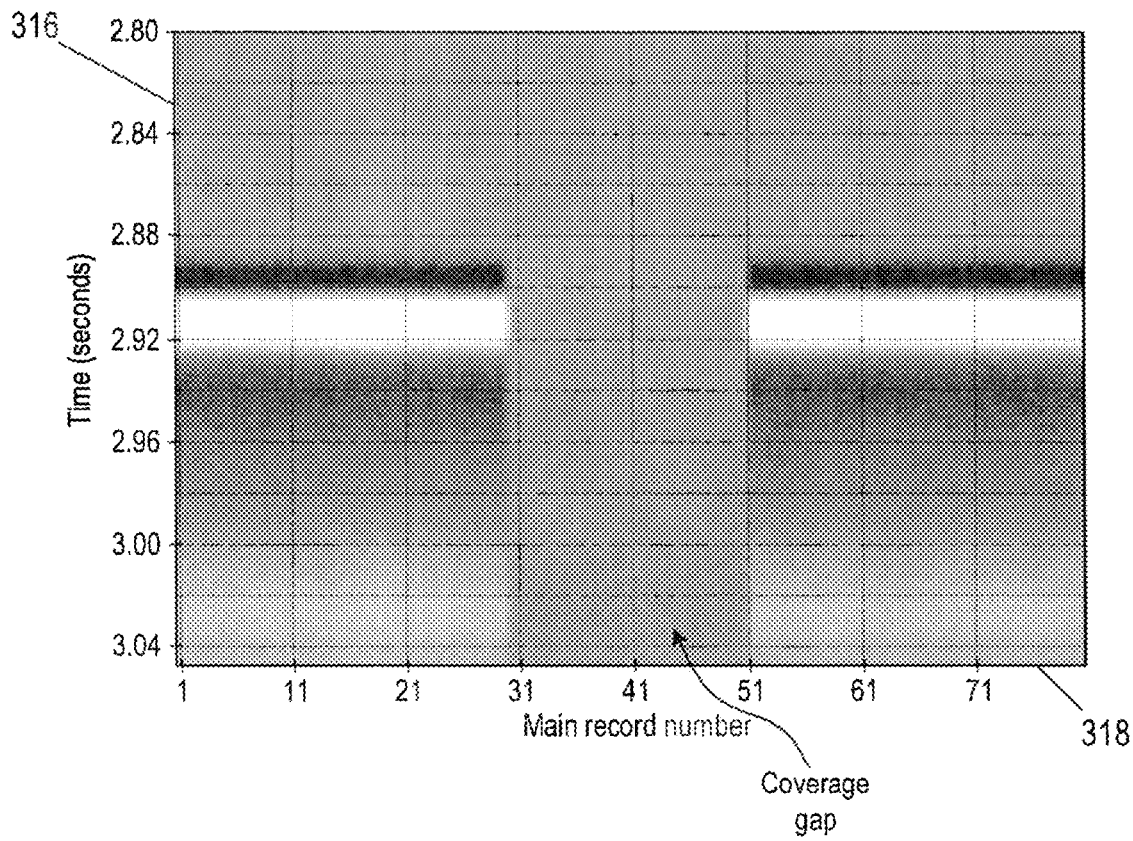
FIG. 3B shows a gather of seismic data with coverage gap in seismic data at the same inline location.

FIG. 3A shows an example of sail lines 301-304 traveled by a survey vessel towing multiple streamers and a coverage gap in recorded seismic data. In this example, a survey vessel 306 tows a source (not shown) and ten streamers (not shown) along the sail lines 301-304 at different times in the marine survey. A streamer spread is represented by dashed line rectangles, such as dashed line rectangle 308. The sail lines of a typical marine survey are spaced apart so that streamer spreads of adjacent sail lines overlap. In the example of FIG. 3A, the streamer spreads overlap by about 50% in the region between the sail lines 301 and 302 and in the region between the sail lines 303 and 305. Lines, such as line 310, represent CMP lines. Adjacent sail lines 301 and 302 and adjacent sail lines 303 and 304 are spaced apart so that no appreciable coverage gaps occur between the CMP lines. In other words, the CMP lines are uniformly spaced apart in the crossline direction for sail lines 301 and 302 and for sail lines 303 and 304. On the other hand, sail lines 302 and 303 are spaced far enough apart that a coverage gap 312 is created between the CMP lines. FIG. 3B shows a gather of seismic data recorded by receivers at the same inline location and over a range of crossline locations as represented by dotted line 314 in FIG. 3A. Vertical axis 316 represents time. Horizontal axis 318 represents trace numbers that correspond to locations along the line 314 in FIG. 3A. The seismic data records reflections from a reflector represented by light and dark shading. The coverage gap 312 between CMP lines in the marine survey shown in FIG. 3A corresponds to a coverage gap in the seismic data recorded in the gather of FIG. 3B.

Generating an Acceptability Map

Methods and systems represent a survey area covered in amarine survey by a two-dimensional CMP fold map. The CMP fold map is a two-dimensional representation of the survey area. The CMP fold map is partitioned into equal-sized CMP bins. Each CMP bin has an associated fold denoted by f. The fold of a CMP bin is the number of traces recorded in the marine survey with midpoint coordinates that lie within the CMP bin.

Figure 4:
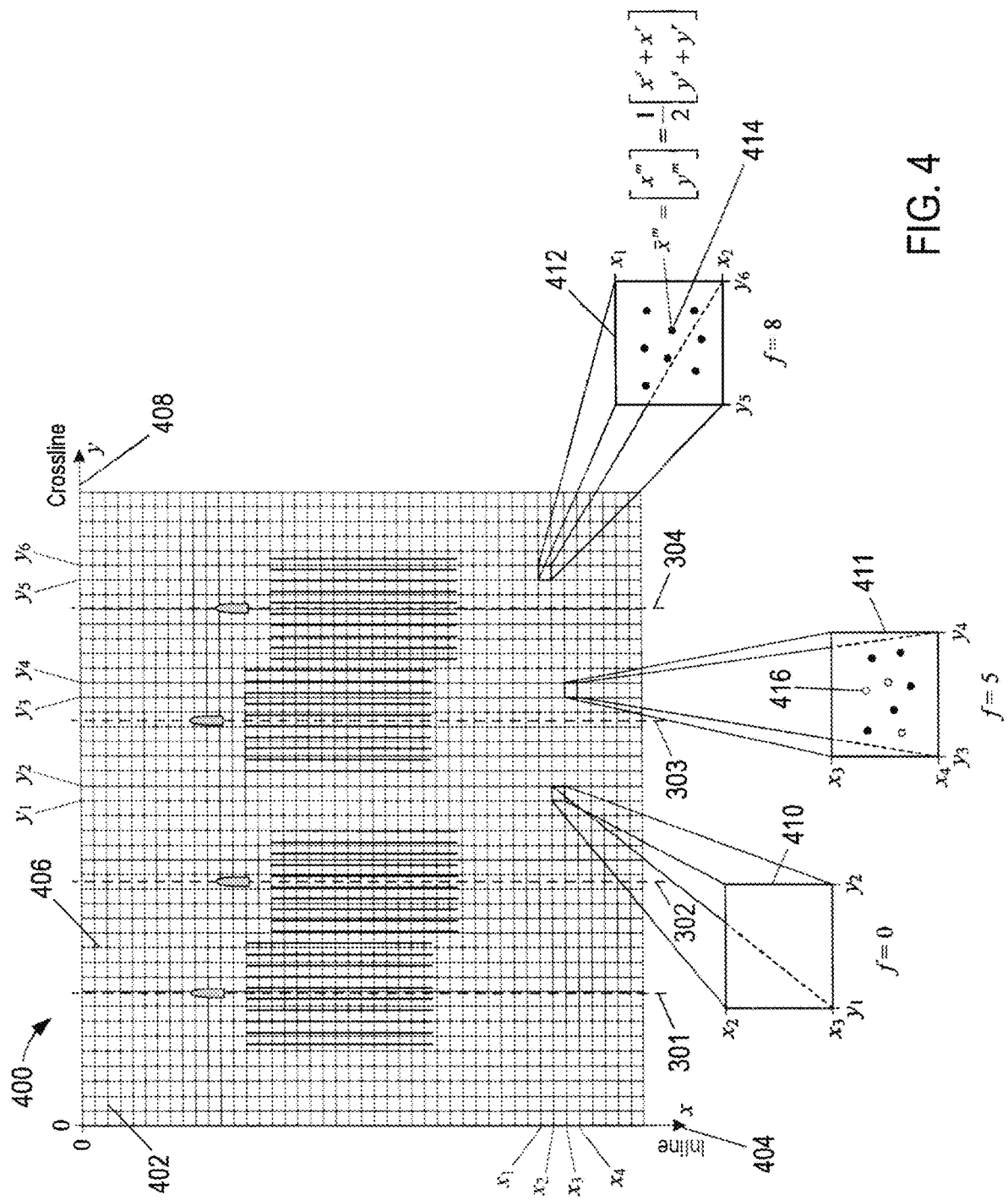
FIG. 4 shows an example CMP ("common midpoint") fold map that represents a survey area covered by a marine survey.

FIG. 4 shows an example CMP fold map 400 that represents a survey area covered by the marine survey described above with reference to FIG. 3A. The CMP fold map 400 comprises sets of regularly spaced horizontal and vertical grid lines that overlay a two-dimensional representation of an actual area surveyed around the sail lines 301-304 traveled by the survey vessel 306 shown in FIG. 3A. Horizontal grid lines, such as horizontal grid line 402, correspond to regularly spaced inline coordinates along inline axis 404. Vertical grid lines, such as vertical grid line 406, correspond to regularly spaced crossline coordinates along crossline axis 408. The regularly spaced grid lines partition the two-dimensional area covered by the marine survey into an array of adjacent, equal sized, non-overlapping CMP bins of the CMP fold map 400. FIG. 4 includes magnified views 410-412 of three highlighted bins of the CMP fold map 400. Coordinates of horizontal and vertical grid lines of the highlight bins are identified along the inline and crossline axes 404 and 408. Solid dots represent midpoint coordinate locations of traces of seismic data recorded in the marine survey and lie within the boundaries of a CMP bin. For example, solid dot 414 in CMP bin 412 represents a CMP coordinate, $\vec{x}^m$, of a trace of seismic data in which the inline CMP coordinate $x^m$ lies within the interval $x_1 < x^m < x_2$ and the crossline CMP coordinate $y^m$ lies within the interval $y_5 < y^m < y_6$. The CMP bin 412 has a fold of f=8. Open dots in CMP bin 411, such as open dot 416, represent discarded traces of seismic data. The CMP bin 411 has a fold of f=5. The CMP bin 410 lies within the coverage gap 312 shown in FIG. 3A and contains no traces of seismic data. The CMP bin 410 has a fold of f=0.

Seismic data recorded in a marine survey is subject to seismic resolution, which is a measure of how small a subsurface feature can be in order to be detected or resolved in an image from recorded seismic data. The two types of seismic resolution are vertical resolution and horizontal resolution. Vertical resolution determines the thickness of the detectable layers within a subterranean formation. Consequently, vertical resolution determines, for example, whether and how well two closely spaced seismic reflectors located at different depths can be resolved. For a reflected pulse represented by a simple wavelet, the maximum vertical resolution is between one-quarter and one-eighth of the dominant wavelength of the wavelet. Horizontal resolution, on the other hand, quantifies the resolvability of seismic waves oriented perpendicular to the direction of seismic wave propagation. Ray paths, such as the ray paths illustrated in FIG. 4, represent the direction of acoustic wavefront propagation and may create the impression that reflections of acoustic energy occur at reflection points. In practice, reflection of an acoustic wavefield from an interface comprises acoustic energy reflected over a large area or region of an interface. A Fresnel zone is the area of an interface from which reflected acoustic energy constructively interferes and reaches a detector with phase differences less than a half-cycle. Thus, the Fresnel zone is a zone around a ray reflection point on a reflector where the path lengths from the source to the receiver, for points within the zone, vary by less than a quarter of a wavelength.

Figure 5:
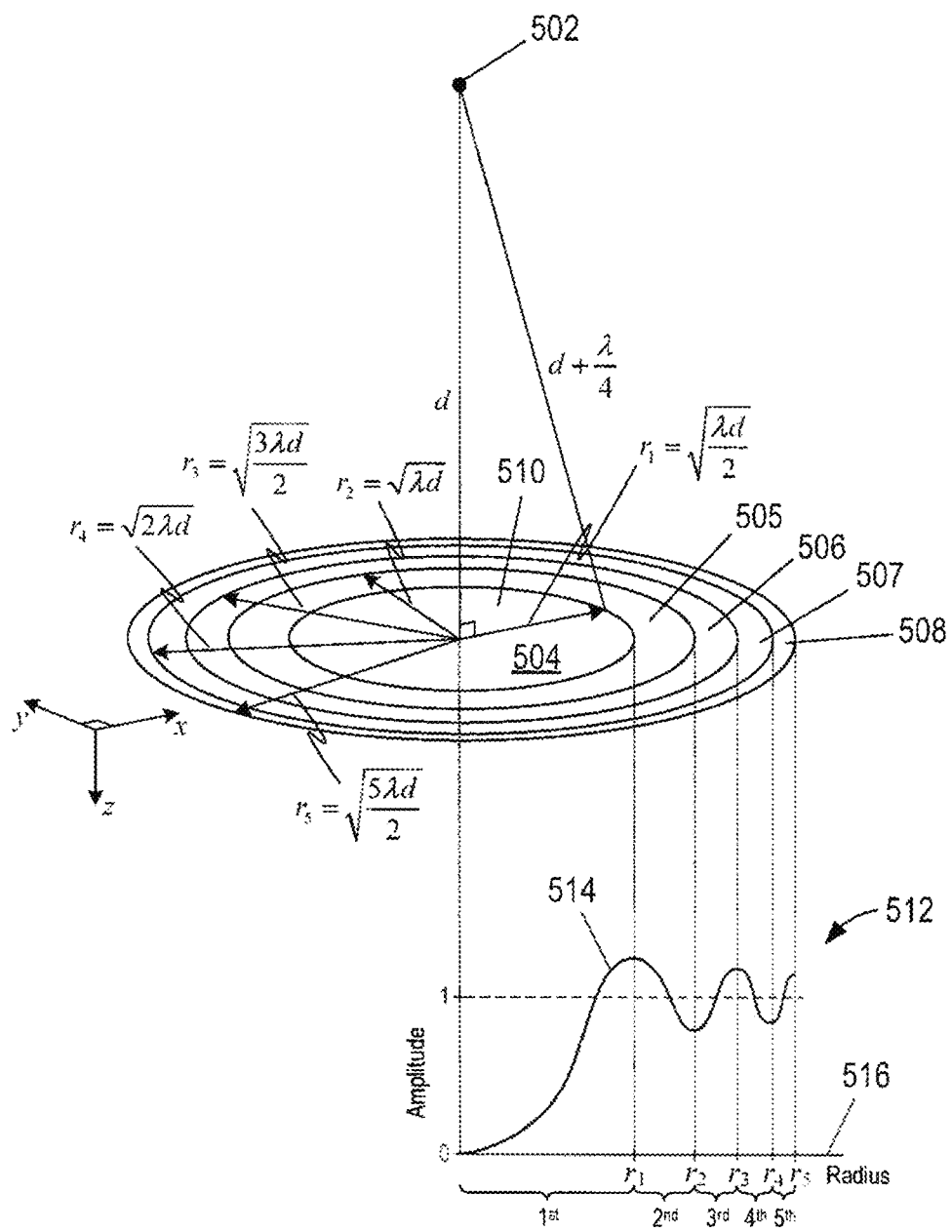
FIG. 5 shows an isometric view of circular concentric Fresnel zones of a reflective horizontal interface.

FIG. 5 shows an isometric view of circular concentric Fresnel zones of a reflective horizontal interface. Solid dot 502 represents a source and coincident receiver (i.e., zero source/receiver offset) located a distance, d, above a reflective horizontal surface. A spherically symmetric source wavefield with a dominant wavelength, $\lambda$, is emitted from the source striking the horizontal surface. Concentric circles mark the boundaries of five different Fresnel zones centered directly below the source and receiver. Acoustic energy of the wavefield that is reflected back to the receiver at the location 502 within half a wavelength (i.e., $\lambda/2$) of the initial reflected arrival interferes constructively to build up the reflected wavefield. The area of the interface that reflects this acoustic energy back to the receiver is called a first Fresnel zone 504. A series of annular rings 505-508 around the first Fresnel zone represent second, third, fourth and fifth Fresnel zones. The general formula for radii of Fresnel zones with zero source/receiver offset is given by $r_n = \sqrt{n\lambda d/2}$, where $d \ll \lambda$ and n=1, 2, 3, ..... Radii of the Fresnel zones are represented by directional arrows emanating from the center of the concentric circles. For example, directional arrow 510 represents the radius of a first Fresnel zone. FIG. 5 includes a plot 512 of the amplitude 514 of the wavefield reflected back to the receiver at the location 502 versus radial distance from the center of the Fresnel zones. The edges of the Fresnel zones are marked on radial axis 516. As the radius of the first Fresnel zone increases, the amplitude of the reflected wavefield increases then tapers off toward the edge of the first Fresnel zone. Destructive and constructive interference between the incident and the reflected wavefields causes the amplitude 514 of the reflected wavefield to oscillate across the second, third, fourth and fifth Fresnel zones.

The first Fresnel zone is taken as a measure of the horizontal resolution of unmigrated seismic data and is hereinafter referred to as "the Fresnel zone." The radius of the Fresnel zone increases as a function of reflector depth. For zero source/receiver offset described above with reference to FIG. 5, the Fresnel zone centered directly below the collocated source and receiver is circular. However, as the source/receiver offset increases, the Fresnel zone transitions from a circular shape to an elliptical shape. The elliptical Fresnel zone is defined by a major axis and a minor axis with the major axis parallel to the source/receiver offset axis.

Figure 6:
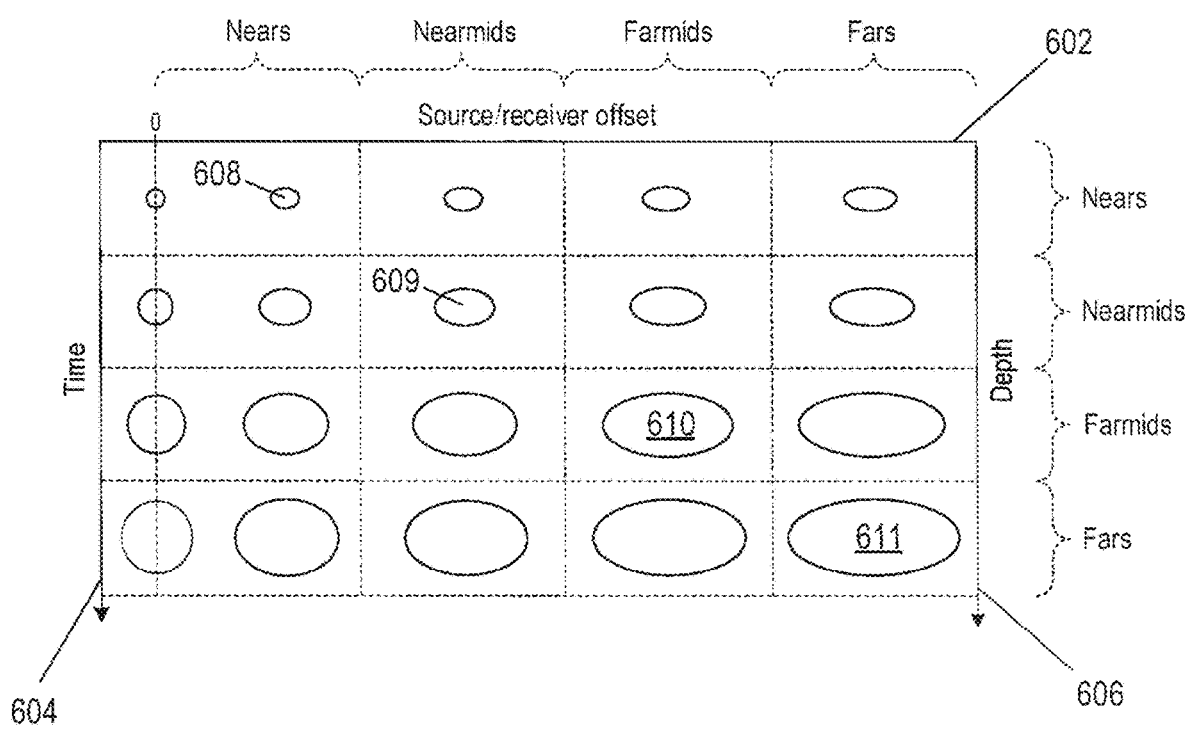
FIG. 6 shows a representation of variations in the shape of Fresnel zones with increasing source-receiver offset, depth, and time constructed from a plane layer model.

FIG. 6 shows a representation of variations in the shape of Fresnel zones with increasing source-receiver offset, depth, and time, constructed from a plane layer model. Horizontal axis 602 represents the source/receiver offset axis. Vertical axis 604 represents time. Vertical axis 606 represents depth. This example plane layer model has four depth horizons. One shallow horizon is used to define the Fresnel zones for the "nears," and then, increasingly deeper horizons are used to define Fresnel zones for the "nearmids," "farmids," and "fars." As shown in FIG. 6, the names "nears," "nearmids." "farmids." and "fars" also refer to source/receiver offset ranges. For example, streamers with a length of 8 km may be partitioned into four equal length source/receiver offset ranges: The 2 km source/receiver offset range located closest to the survey vessel is labeled "nears;" The next closest 2 km source/receiver offset range is labeled "nearmids;" The next farthest 2 km source/receiver offset range is labeled "farmids;" And the farthest 2 km source/receiver offset range is labeled "fars." The shape and size of the Fresnel zones increase with increasing source/receiver offset, depth, and time. Circles at zero source/receiver offset represent survey areas of Fresnel zones with radii that increase with time and depth. Ellipses represent elliptical Fresnel zones for non-zero source/receive offsets. The areas, and in particular the major axes, of the Fresnel zones increase with increasing source/receiver offset and with increasing time and depth. The Fresnel zones represented by ellipses 608-611 illustrate changes in the major and minor axes of the Fresnel zones with increasing source/receive offset, time, and depth. In other implementations, the source/receiver offsets and depths of the plane layer model may be partitioned into a larger number of source/receiver offset ranges, such as five, six, or more source/receiver offset ranges and depth horizons.

The zero-offset formula used to represent the circular Fresnel zones in FIG. 5 assumes a constant velocity in the layer between the source and the reflective interface. For a layer with a linearly varying velocity with respect to depth, the formula representation of the Fresnel zone is more complicated. There is no geometric formula for the Fresnel zone for zero and non-zero source/receiver offsets in which the velocity varies across the layer between the source and reflective interface.

Prior to the start of a marine survey, three-dimensional ("3D") Kirchhoff migration is applied to subintervals of a plane layer model of the subterranean formation to be covered by the survey area to obtain corresponding 3D impulse responses of the subintervals. For example, 3D Kirchhoff migration may be used to obtain 3D impulse responses in the near, nearmids, farmids, and fars of the source/receiver offset and depth subintervals of the plane layer model in FIG. 6. A 3D Fresnel zone is the stationary zone at the center of a 3D impulse response, where there is less than a one-half period shift in the impulse response. The distances a Fresnel zone extends in the inline and crossline directions of a subinterval of a plane layer model are determined from 3D Kirchhoff migration applied to the plane layer model.

Figures 7A, 7B:
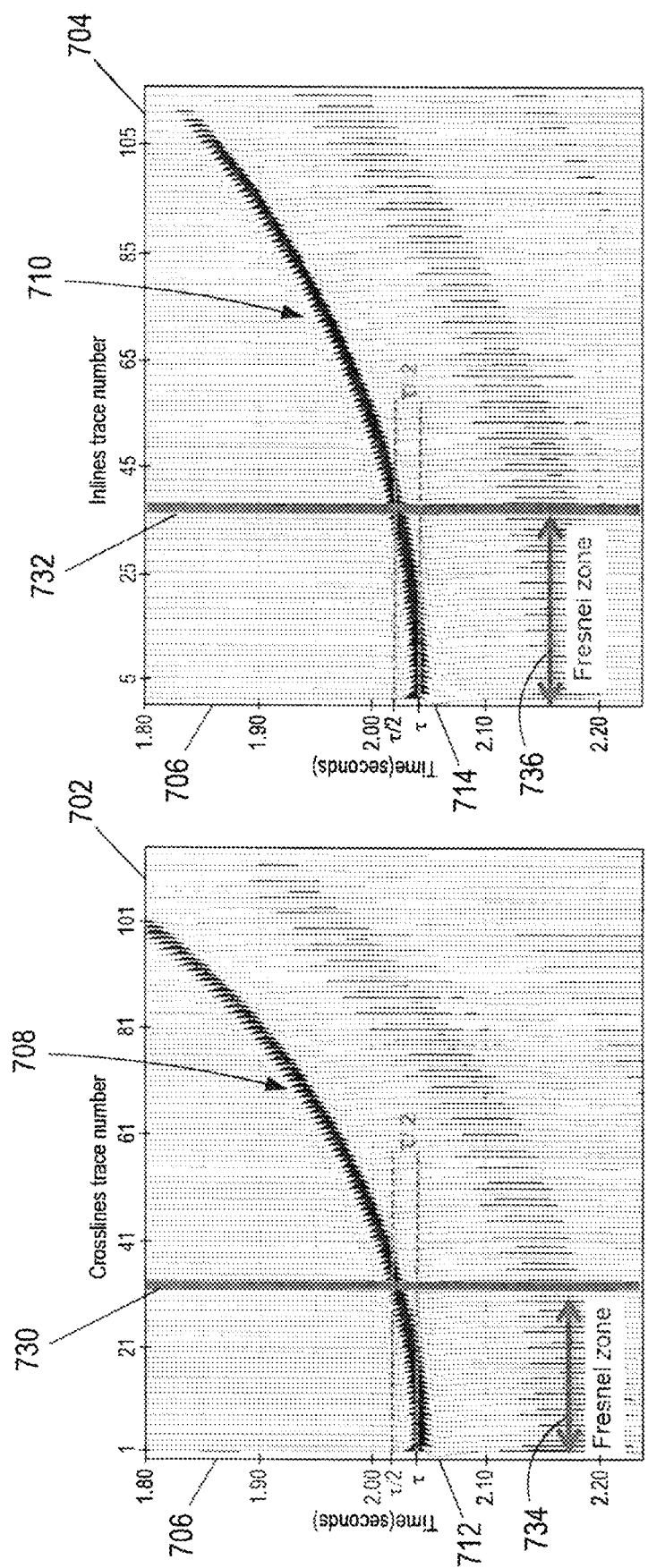
FIGS. 7A-7B show an example of crossline and inline gathers of traces of an impulse response.

FIGS. 7A-7B show an example of crossline and inline gathers of traces of an impulse response in a subinterval of a plane layer model of a subterranean formation determined using 3D Kirchhoff migration. The crossline gather of traces in FIG. 7A is called the crossline impulse response. The inline gather of traces in FIG. 7B is called the inline impulse response. In FIGS. 7A and 7B, horizontal axes 702 and 704 represent crossline and inline trace numbers respectively, and vertical axis 706 represents the same time interval. The crossline impulse response is represented by an arc of wavelets 708 that decrease in time with increasing crossline distance. The inline impulse response is represented by an are of wavelets 710 that also decrease in time with increasing inline distance. In FIG. 7A, a stacked trace 712 at trace number 1 is obtained by stacking the traces of the crossline gather with a fold equal to the number of traces in the crossline gather. In FIG. 7B, a stacked trace 714 at trace number 1 is obtained by stacking the traces of the inline gather with a fold equal to the number of traces in the inline gather-. The stacked traces 712 and 714 are shifted back in time with respect to the lowest numbered traces (i.e., trace number 2) of the crossline and inline impulse responses.

The distance a Fresnel zone extends in the inline (crossline) direction is determined by cross-correlating the stacked trace of the inline (crossline) gather with each impulse response trace of the inline (crossline) gather. For each inline impulse response trace, the cross-correlation of the inline impulse response trace with the inline stacked trace is given by $$c_n^{in}(t_k) = \frac{1}{2J-1} \sum_{j=1}^{J} tr_{j,stack}^{in} \times tr_{j+k,n}^{in} \quad (3a)$$

where
$tr_{j,stack}^{in}$ is an amplitude of the inline stacked trace at time sample $t_j$;
$tr_{j+k,n}^{in}$ is an amplitude of the n-th inline trace of the inline impulse response at time sample $t_{j+k}$;
n=1, . . . , N is the inline trace number index;
N is the number of inline traces in the inline gather; and
k=1, . . . , 2J−1 is the time lag index.
For each crossline impulse response trace, the cross-correlation of the crossline impulse response trace with the crossline stacked trace is given by $$c_n^X(t_k) = \frac{1}{2J-1} \sum_{j=1}^{J} tr_{j,stack}^X \times tr_{j+k,m}^X \quad (3b)$$

where
$t_{j,stack}^X$ is an amplitude of the crossline stacked trace at time sample $t_j$;
$tr_{j+k,m}^X$ is an amplitude of the n-th crossline trace of the crossline impulse response at time sample $t_{j+k}$;
m=1, . . . , M is the crossline trace number index; and
M is the number of crossline traces in the crossline gather.
The time lag of the cross-correlation peak is used to determine a shift between the stacked trace and each impulse response trace, starting from the shortest offset impulse response trace (i.e., i=1). For example, the time lag of the cross-correlation peak with the inline impulse response traces is $$\operatorname*{argmax}_{n,k}\{c_n^{in}(t_k)\}$$

and the time lag of the cross-correlation peak with the crossline impulse response traces is $$\operatorname*{argmax}_{n,k}\{c_n^X(t_k)\}.$$

When the shift is one-half the period τ of a far-field source signature (i.e., τ/2) of a source wavefield in the inline (crossline) direction, the edge of the Fresnel zone is reached and the distance to the impulse response trace equals the Fresnel zone radius in the inline (crossline) direction. The period τ of the far-field source signature may be estimated from a first zero-crossing after the two largest amplitude peaks of far-field source signature.

FIG. 7C shows a plot of an example far-field signature of a source wavefield emitted from a source. Horizontal axis 716 represents time. Vertical axis 718 represents pressure amplitude. Curve 720 represents the far-field signature. Primary peak 722 represents the direct downgoing portion of a source wavefield emitted from the source. Secondary peak 724 represents a second time-delayed downgoing pressure wavefield created by the upgoing portion of the source wavefield reflected downward from the free surface. The first zero-crossing 726 of the time axis 716 after the two largest amplitude peaks 722 and 724 is the estimated period τ 726 of the far-field signature with half period occurring at time 728.

In FIG. 7A, the period τ is aligned with a peak of the trace at inline trace number 2 and one half the period τ/2 is aligned with a peak of the trace at inline trace number 33. The extent of the Fresnel zone in the crossline direction is indicated by bolded line 730 at trace 33. In FIG. 7B, the period τ is aligned with a peak of the trace at inline trace number 2 and one half the period τ/2 is aligned with a peak of the trace at inline trace number 37. The extent of the Fresnel zone in the inline direction is indicated by bolded line 728 at trace 37. A 3D migration operator sums migration corrected traces over a large fixed radius, typically about 3-5 km, but only the part within the 3D Fresnel zone contributes to the migrated image. In other words, the 3D Fresnel zone in the 3D migration operator refers to the constructive interference summation of traces to form a migrated image. The remainder of the traces outside the crossline Fresnel zone 732 and the inline Fresnel zone 734 cancel. The Fresnel zones of the subintervals of the plane layer model are then used for infill monitoring at all locations of the survey area.

The stacked impulse response trace is cross correlated, at zero lag, with each trace of the impulse response to obtain a Fresnel weight for each trace. The Fresnel weight represents the effect the trace has on a final image. For example, inline Fresnel weights may be calculated by stacking the inline stacked trace with each trace of the inline impulse response as follows:

$$w_n^{in} = \frac{1}{N_{in}} \sum_{j=1}^{J} tr_{j,stack}^{in} \times tr_{j,n}^{in} \quad (4a)$$

where $N_{in} = \Sigma_{j=1}^{J} = tr_{j,n}^{in}$ normalizes the weight.
Crossline Fresnel weights may be calculated by stacking the crossline stacked trace with each trace of the crossline impulse response as follows:

$$w_m^{Xline} = \frac{1}{M_X} \sum_{j=1}^{J} tr_{j,stack}^X \times tr_{j,m}^X \quad (4b)$$

where $M_x = \sum_{j=1}^{J} = tr_{j,m}^{in}$ normalizes the weight.

Figure 8:
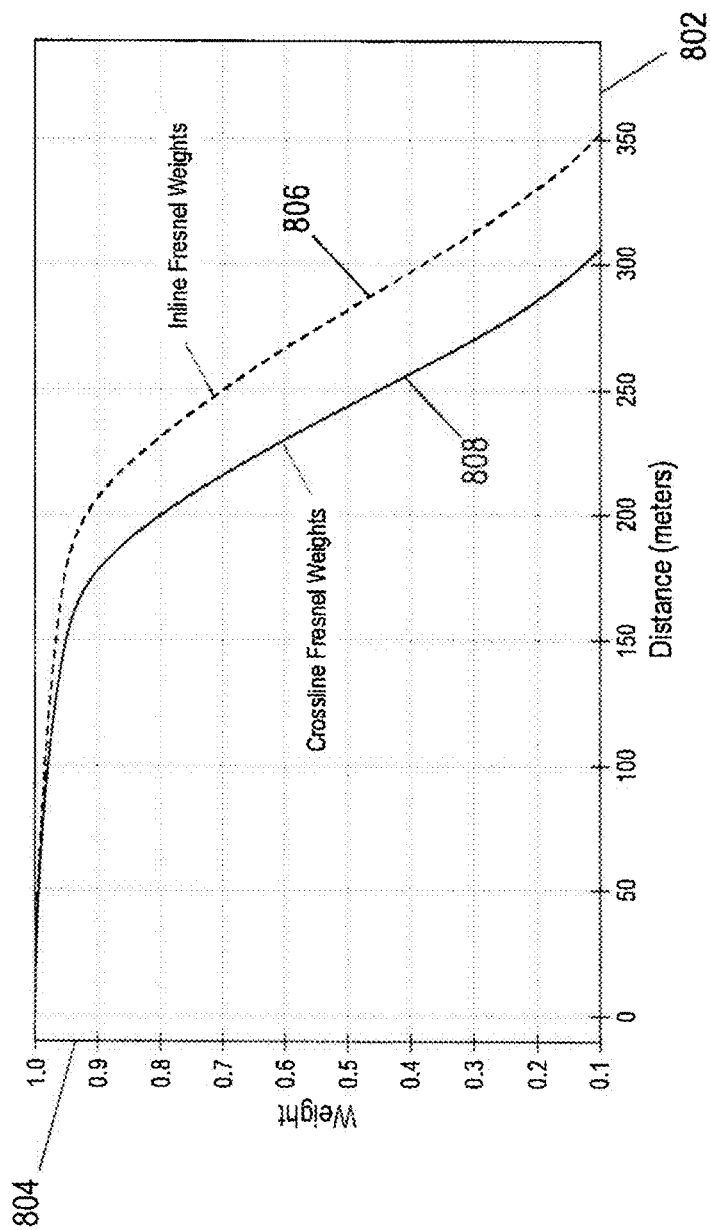
FIG. 8 shows a plot of example inline and crossline Fresnel weights of a Fresnel zone.

FIG. 8 shows a plot of example inline and crossline Fresnel weights of a Fresnel zone located at a particular source/receiver offset. Horizontal axis 802 represents distance of a trace from the corresponding stacked trace located at zero. Vertical axis 804 represents the normalized range of inline and cross weights. Dashed curve 806 represents inline Fresnel weights with respect to distance from the center of the Fresnel zone. Solid curve 808 represents crossline Fresnel weights with respect to distance from the center of the Fresnel zone. The Fresnel weights include smoothing to ensure the weights monotonically decrease from 1.0 to 0.0. Smoothing reduces wobble in the curves 806 and 808 at short distances with the weights varying between about 0.95 and about 1.0.

The Fresnel weights of a 3D Fresnel zone are computed over the elliptical areas occupied by the Fresnel zones for different source/receiver offsets and depths of the plane layer model. For example, the Fresnel weight may be calculated in the crossline direction (i.e., minor axis) and stretched along the elliptical radius to reach points around the elliptical boundary of the Fresnel zone. In other words, only one curve representing the Fresnel weight (e.g., in the crossline direction) is needed to construct the elliptical operator with the curve stretched to fit the radius of the ellipse in any given direction. The Fresnel weights associated with a 3D Fresnel zone are used to construct a Fresnel sum operator.

Figure 9:
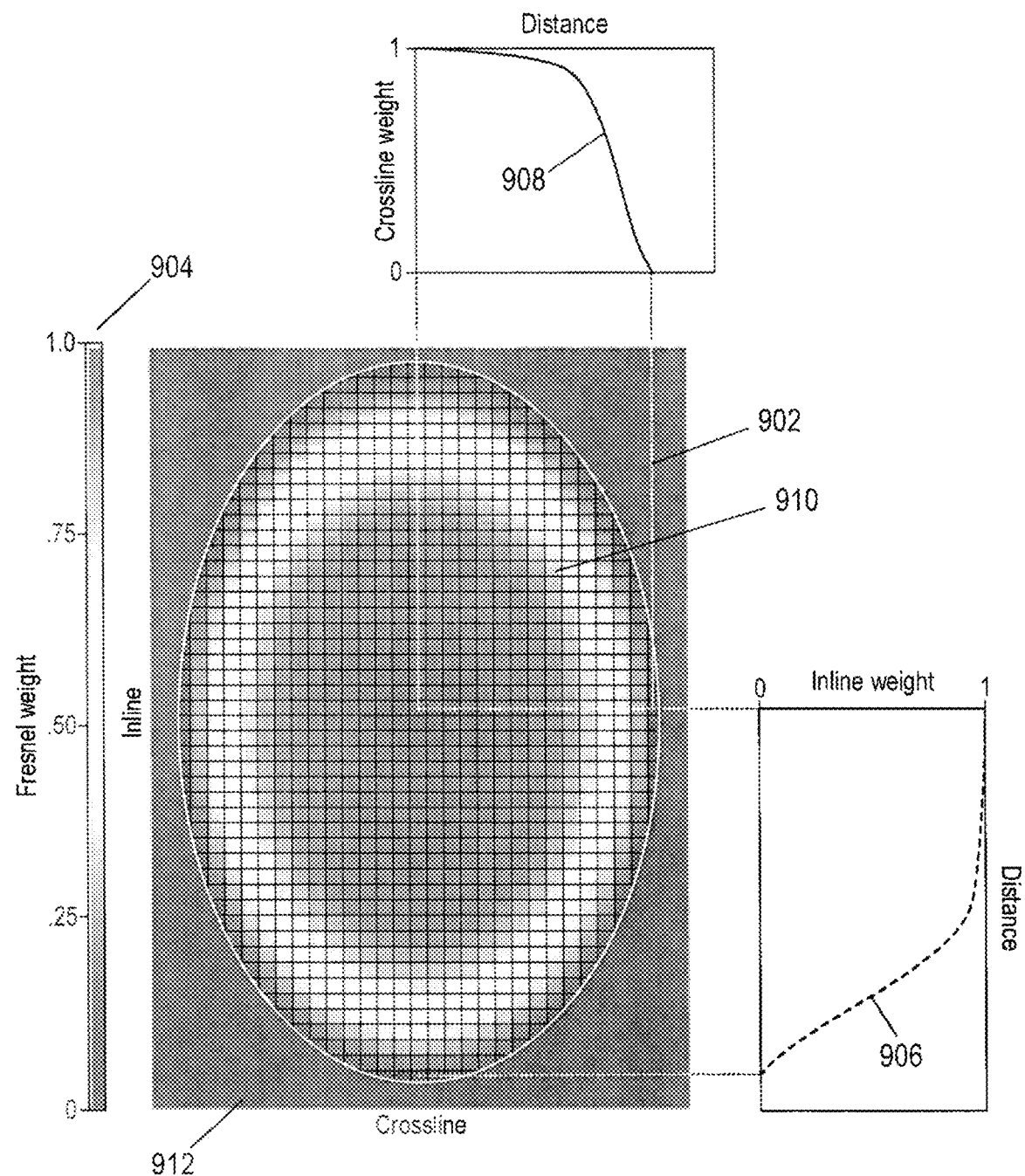
FIG. 9 shows a plot of an example Fresnel sum operator computed over an area of an elliptical Fresnel zone.

FIG. 9 shows a plot of an example Fresnel sum operator computed over an area of an elliptical Fresnel zone centered at a non-zero source/receiver offset and depth. White ellipse 902 represents the boundary of an elliptical Fresnel zone. The Fresnel zone has been partitioned into equal sized Fresnel zone bins represented by rectangles that match the size and shape of the bins in the CMP fold map. Grid lines in the inline and crossline directions represent the boundaries of the Fresnel zone bins. FIG. 9 includes a plot of inline Fresnel weights 906 and a plot of crossline Fresnel weights 908 associated with the Fresnel zone. Each Fresnel zone bin has an associated Fresnel weight represented by a different shading. The Fresnel weight associated with each Fresnel zone bin corresponds to a shade of a gray scale Fresnel weight bar 904 with a continuum of shading that represents the continuum of Fresnel weights ranging from zero to one. For example, the Fresnel zone bin at the center of the Fresnel zone is shaded to correspond to a Fresnel weight of one, Fresnel zone bin 910 has a shade that corresponds to a Fresnel weight of about 0.75, and dark shaded Fresnel zone bin 912 outside the Fresnel zone corresponds to a Fresnel weight of zero.

Figures 10A, 10B, 10C, 10D:
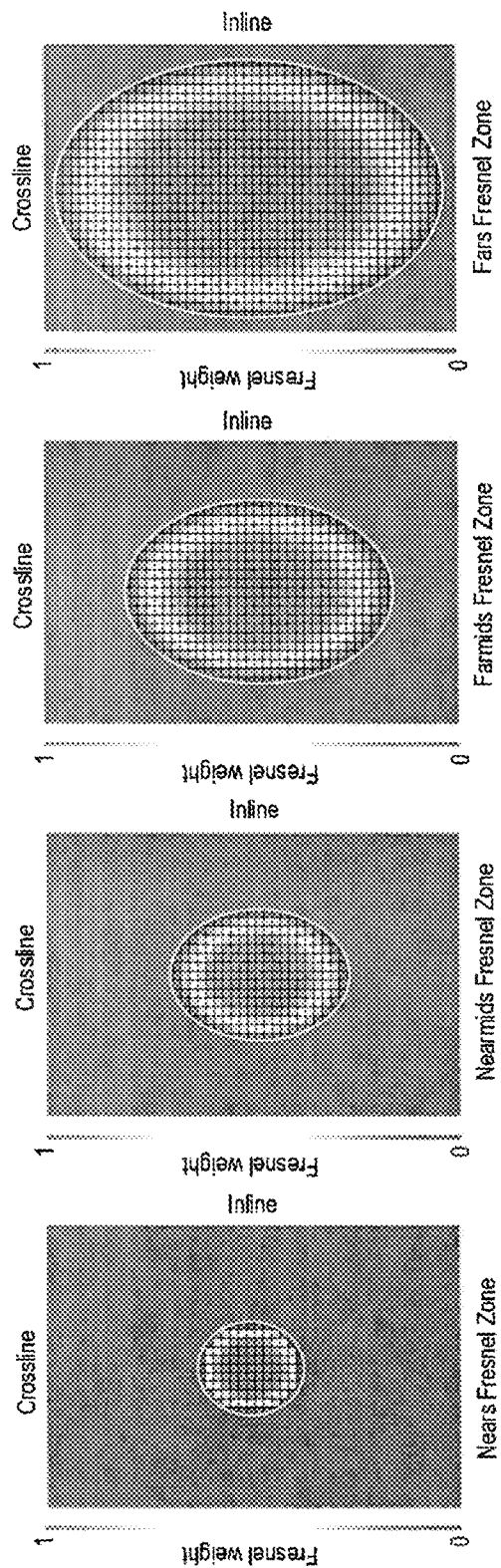
FIGS. 10A-10D show plots of Fresnel sum operators of four Fresnel zones located at four different source/receiver offsets and depths.

FIGS. 10A-10D show plots of Fresnel sum operators of four Fresnel zones located at four different source/receiver offsets and depths of a plane layer model. The areas and major and minor axes of the Fresnel zones increase with increasing source/receiver offset and depth and are labeled as "nears," "nearmids," "farmids" and "fars" as described above with reference to FIG. 6. For example, FIG. 10A shows a Fresnel sum operator in the nears and FIG. 10B shows a Fresnel zone in the nearmids as described above with reference to FIG. 6. The Fresnel zone of the Fresnel sum operator in FIG. 10B has a greater source/receiver offset and depth than the source/receiver offset and depth of the Fresnel zone of the Fresnel sum operator shown in FIG. 10A. FIGS. 10A-10B also show the Fresnel sum operator partitioned into Fresnel zone bins of equal size and are shaded according to the associated Fresnel weight as described above with reference to FIG. 9.

Figure 11:
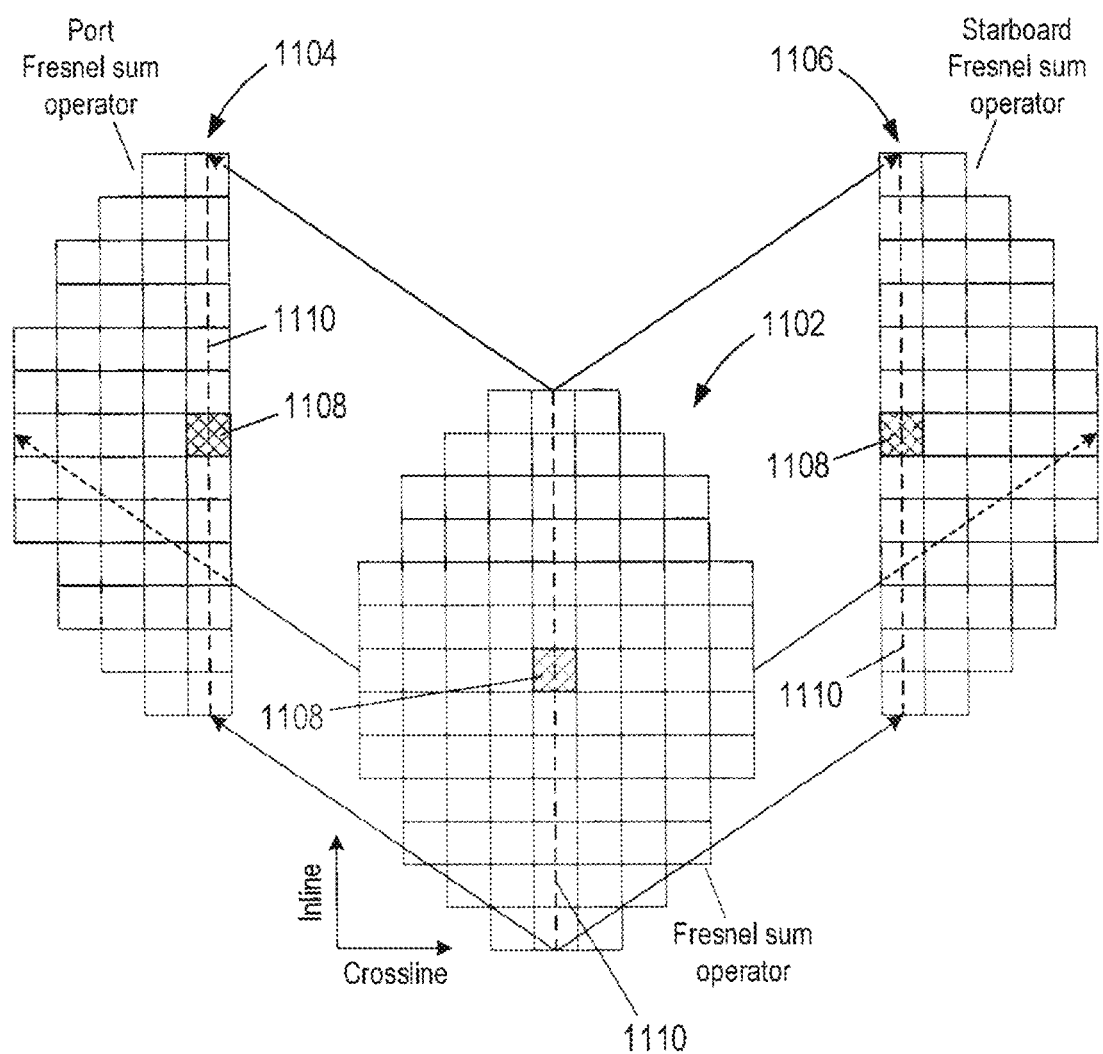
FIG. 11 shows an example Fresnel sum operator divided into a port Fresnel sum operator and a starboard Fresnel sum operator.

A Fresnel sum operator may be divided into a port Fresnel sum operator and a starboard Fresnel sum operator. FIG. 11 shows an example Fresnel sum operator 1102 divided into a port Fresnel sum operator 1104 and a starboard Fresnel sum operator 1106. Grid lines mark the boundaries of the Fresnel zone bins. Each Fresnel zone bin has an associated Fresnel weight as described above with reference to FIGS. 9-10D. For the sake of illustration, shadings that represent Fresnel weights in the Fresnel zone bins of FIGS. 9-10D have been omitted. Hash-marked square 1108 represents a Fresnel zone bin located at the center of the Fresnel sum operator. Dashed line 1110 marks the major axis of the Fresnel sum operator 1102. As shown in FIG. 11, the port Fresnel sum operator 1104 comprises Fresnel zone bins of one side of the Fresnel sum operator 1102 and the starboard Fresnel sum operator 1106 comprises Fresnel zone bins of the other side of the Fresnel sum operator 1102. In this example, the port and starboard Fresnel sum operators 1104 and 1106 have in common the central Fresnel zone bin 1108 and Fresnel zone bins located along the major axis 1110 of the Fresnel sum operator 1102.

For each CMP bin of a CMP fold map, the central Fresnel zone bins of the port and starboard Fresnel sum operators are centered on the CMP bin. Port and starboard coverage values are computed for each CMP bin of the CMP bin fold map. A port coverage value for a CMP bin is computed by $$A_p = \frac{1}{W_p} \sum_{b \in B_p} w_b f_b \quad (5a)$$

and a starboard coverage value for the same CMP bin is computed by $$A_s = \frac{1}{W_s} \sum_{b \in B_s} w_b f_b \quad (5b)$$

where
  b is an index for CMP bins within the Fresnel zone;
  $f_b$ is the fold of the b-th CMP bin within the Fresnel zone;
  $w_b$ is the Fresnel weight of the Fresnel zone bin of the Fresnel zone that corresponds to the CMP bin;
  $B_p$ is the subset of CMP bins within the area of the Fresnel zone covered by the port Fresnel sum operator;
  $B_s$ is the subset of CMP bins within the area of the Fresnel zone covered by the starboard Fresnel sum operator;
  $W_p = \sum_{b \in B_p} w_b$ normalizes the port coverage value; and
  $W_s = \sum_{b \in B_s} w_b$ normalizes the starboard coverage value.

Figure 12:
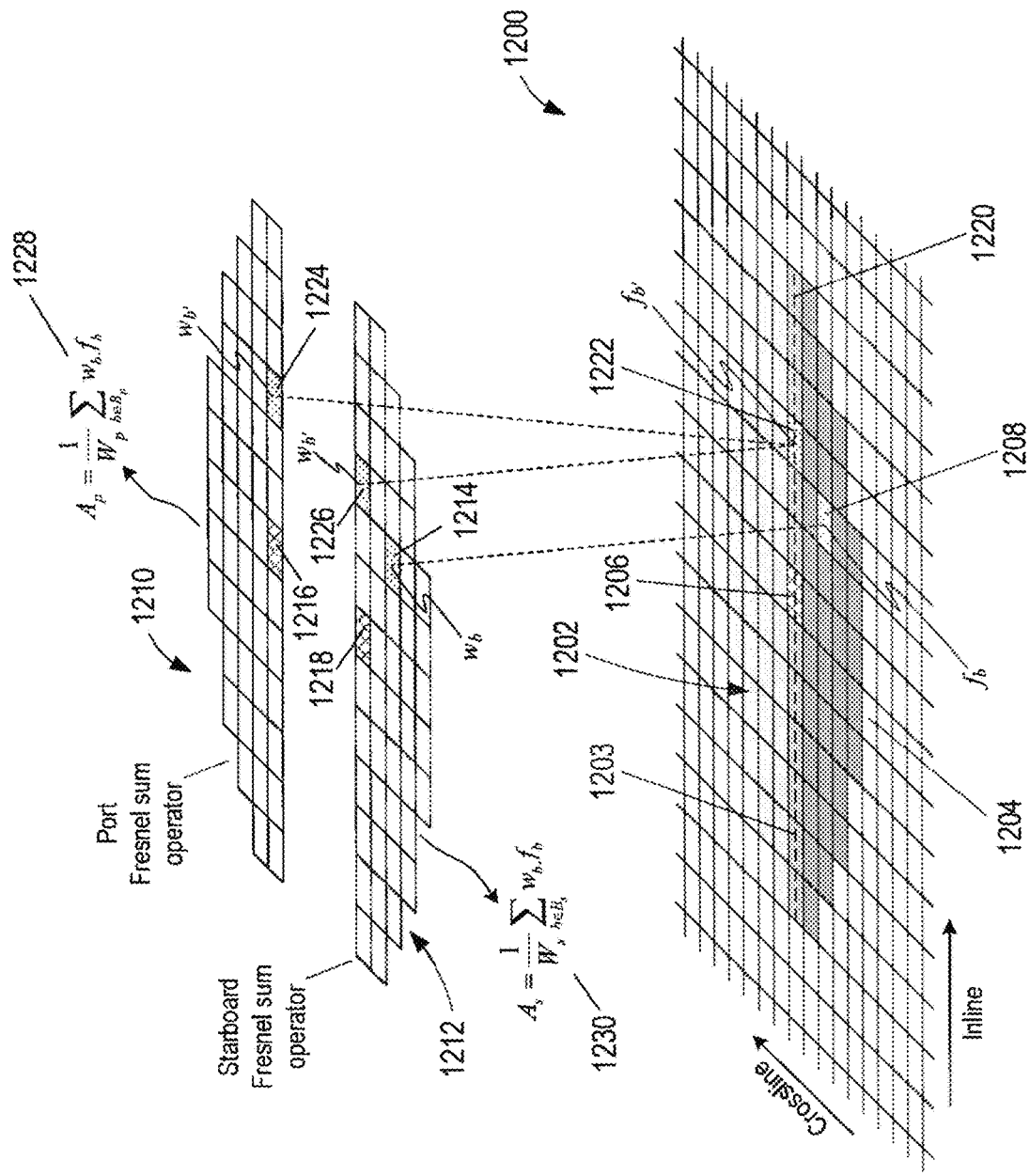
FIG. 12 shows a perspective view of port and starboard Fresnel sum operators applied to a CMP bin of a CMP fold map.

FIG. 12 shows a perspective view of port and starboard Fresnel sum operators applied to a CMP bin of a CMP fold map 1200. Shaded areas 1202-1204 identify CMP bins that lie within an elliptical-shaped Fresnel zone centered at a CMP bin 1206. Each CMP bin has an associated fold. For example, CMP bin 1208 has a fold denoted by $f_b$. Port Fresnel zone sum operator 1210 and starboard Fresnel zone operator 1212 are shown above the CMP fold map 1200. The port and starboard Fresnel sum operators 1210 and 1212 comprise Fresnel zone bins with associated Fresnel weights.

Each Fresnel zone bin corresponds to a CMP bin in the Fresnel zone. For example, Fresnel zone bin 1214 has a Fresnel weight $w_b$ and corresponds to the CMP bin 1208. The port Fresnel sum operator 1212 includes a Fresnel zone region 1218 centered on the CMP bin 1206 and the starboard Fresnel sum operator 1210 includes a Fresnel zone bin 1216 that is also centered on the CMP bin 1206. The port Fresnel sum operator 1210 includes Fresnel zone bins that correspond to CMP bins located along the major axis 1220 of the Fresnel zone. The starboard Fresnel sum operator 1212 also includes Fresnel zone bins that correspond to CMP bins located along the major axis 1220 of the Fresnel zone. For example, CMP bin 1222 is located along the major axis of the Fresnel zone and corresponds to Fresnel zone bin 1224 of the port Fresnel sum operation 1210 and Fresnel zone bin 1226 of the starboard Fresnel sum operator 1212. The subset of CMP bins $B_p$ associated with computing the port coverage value 1228 for the CMP bin 1206 are identified by light and medium shaded areas 1202 and 1203. The subset of CMP bins $B_s$ associated with computing the starboard coverage value 1230 for the CMP bin 1206 are identified by medium and dark shaded areas 1203 and 1204. The subsets $B_p$ and $B_s$ intersect at CMP bins located along the major axis 1220. For example, the fold $f_b$, of CMP bin 1222 contributes to calculation of the port and starboard coverage values 1228 and 1230 with the same Fresnel weight $w_b$, assigned to Fresnel zone bins 1224 and 1226.

Each CMP bin of the CMP fold map is identified as an acceptable bin, borderline bin, or unacceptable bin, based on the corresponding port and starboard coverage values compared to an acceptable threshold $Th_{acc}$ and an unacceptable threshold $Th_{un}$, where $Th_{acc} > Th_{un}$. The acceptable threshold $Th_{acc}$ and unacceptable threshold $Th_{un}$ are determined as described below with reference to FIG. 13. A CMP bin may be identified as an acceptable bin when the corresponding port and starboard coverage values satisfy the following acceptability condition:

$$\max(A_p, A_s) > Th_{acc} \quad (6)$$

A CMP bin may be identified as a borderline bin when the corresponding port and starboard coverage values satisfy the following borderline condition:

$$Th_{acc} > \max(A_p, A_s) > Th_{un} \quad (7)$$

A CMP bin may be identified as an unacceptable bin when the corresponding port and starboard coverage values satisfy the following unacceptable condition:

$$\max(A_p, A_s) \le Th_{un} \quad (8)$$

Figure 13:
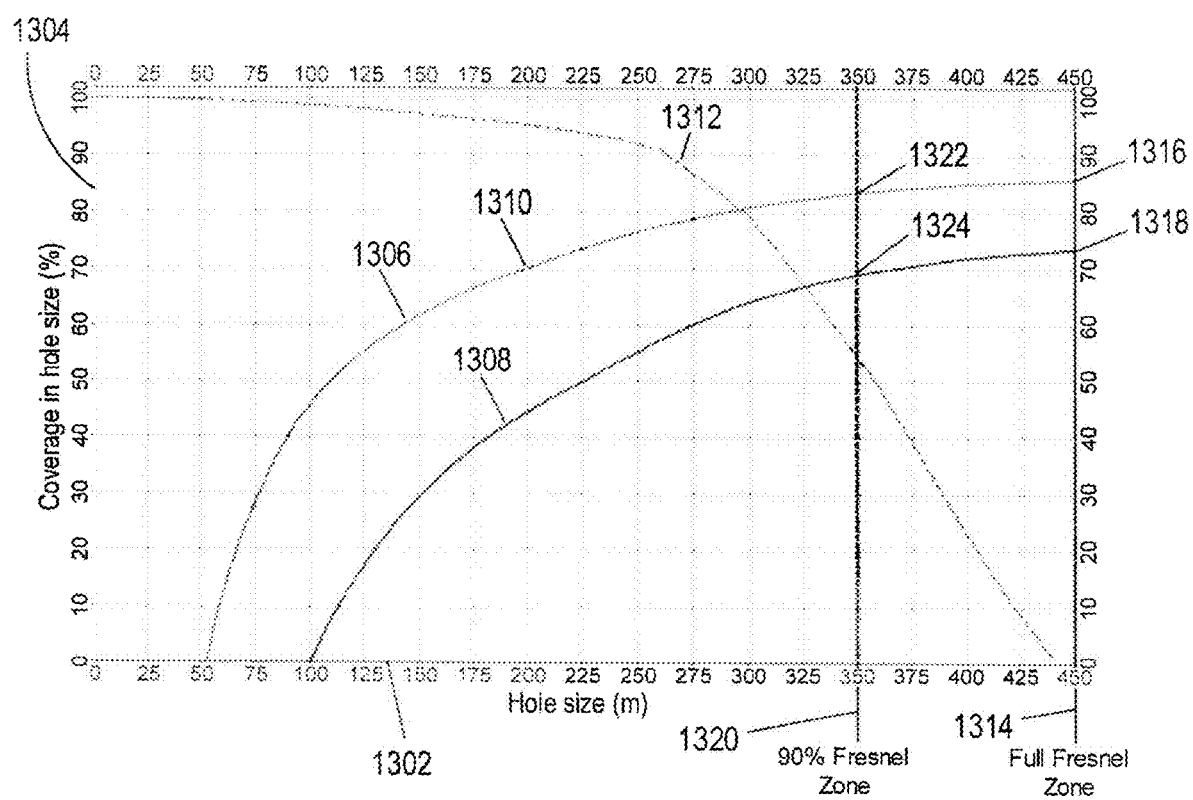
FIG. 13 shows a plot of acceptable and unacceptable thresholds based on hole size and percentage of coverage in hole size.

FIG. 13 shows a plot of acceptable and unacceptable thresholds based on hole size and percentage of coverage in hole size. Horizontal axis 1302 represents hole size in meters (i.e., diameter of a hole). Vertical axis 1304 represents percent coverage within the hole. For each hole size, the coverage within the hole (i.e., number of CMPs) varies from zero (completely empty hole) to 100% (no hole) for a two-dimensional grid of data. For example, a zero percent coverage corresponds to an empty hole and a fifty percent coverage corresponds to a hole in which the bins have one half of an expected nominal fold. The percent coverage is a fraction of a nominal fold of the survey. The nominal fold is calculated directly from the survey geometry. The amplitudes at each grid point (not shown) are the dB loss relative to data with no gap. Curve 1306 is a 1.5 dB contour that serves as an acceptable contour. Curve 1308 is a 3 dB contour that serves as an unacceptable contour. The acceptable and unacceptable contours are decided prior to the marine survey. Points in the plane have a hole size and a coverage in the hole size and corresponding dB loss relative to data with no gap. For example, point 1310 is located along contour 1306, has a hole size of about 200 m, about 70% coverage, and a 1.5 dB loss relative to data with no gap. Holes with hole sizes and percent coverage above the contour 1306 correspond to acceptable CMP bins. Holes with hole sizes and percent coverage between the contours 1306 and 1308 correspond to borderline CMP bins. Holes with hole sizes and percent coverage that are less than the contour 1408 correspond to unacceptable bins. Dashed curve 1312 represents the Fresnel zone weight. Dashed line 1314 represents the maximum major axis length of the full Fresnel zone and corresponds to the maximum length of the contours 1306 and 1308, which is 450 m in the example of FIG. 13. The acceptable threshold $Th_{acc}$ and the unacceptable threshold $Th_{un}$ may be set equal to the values 1316 and 1318, respectively, of the corresponding curves 1306 and 1308 at the full Fresnel zone.

As described above with reference to FIGS. 9 and 10, the Fresnel zone weights taper to zero near the outside edge of a Fresnel zone. Averaging Fresnel zone weights up to the edge of the Fresnel zone where the Fresnel weights approach zero flattens the average, independent of the CMP folds. To avoid flattening, methods and systems may include trimming the area of a Fresnel zone by a percentage of the total Fresnel weights of the Fresnel zone. The weight of the resulting trimmed Fresnel zone is used to compute port and starboard coverage values. The percentage may be anywhere from about 75% to about 95% of a Fresnel zone and typically depends on where the Fresnel weights begin to flatten. The weighted Fresnel zone averaging is carried out over the selected percentage of the summed amplitudes in the Fresnel zone. For example, in FIG. 13, computing the weighted average up to the edge of the Fresnel zone marked by dashed line 1314 where the Fresnel weights approach zero flattens the weighted average used to compute the coverage areas, independent of the fold, which may cross the contours 1306 and 1310 near the maximum hole size. In order to avoid this case, the Fresnel zone may be trimmed. In this example, the Fresnel zone is trimmed so that more than 90% of the total weights have been used to compute the port and starboard coverage values. Dashed line 1320 represents 90% of the Fresnel zone. As a result, the corresponding Fresnel zone operator is trimmed such that 90% of the total Fresnel weights are applied to the weighted average. In other words, the weighted Fresnel zone averaging represented by Equations (5a) and (5b) is performed over an inner Fresnel zone comprising 90% of the summed amplitudes in the Fresnel zone. In another implementation, the acceptable and unacceptable thresholds $Th_{acc}$ and $Th_{un}$ may be set equal to the values where the corresponding curves 1306 and 1308 begin to flatten, such as values 1322 and 1324. For example, if we use the 90% Fresnel zone in FIG. 16 then $Th_{acc}$=83% and $Th_{un}$=69% of the full fold.

Figure 14:
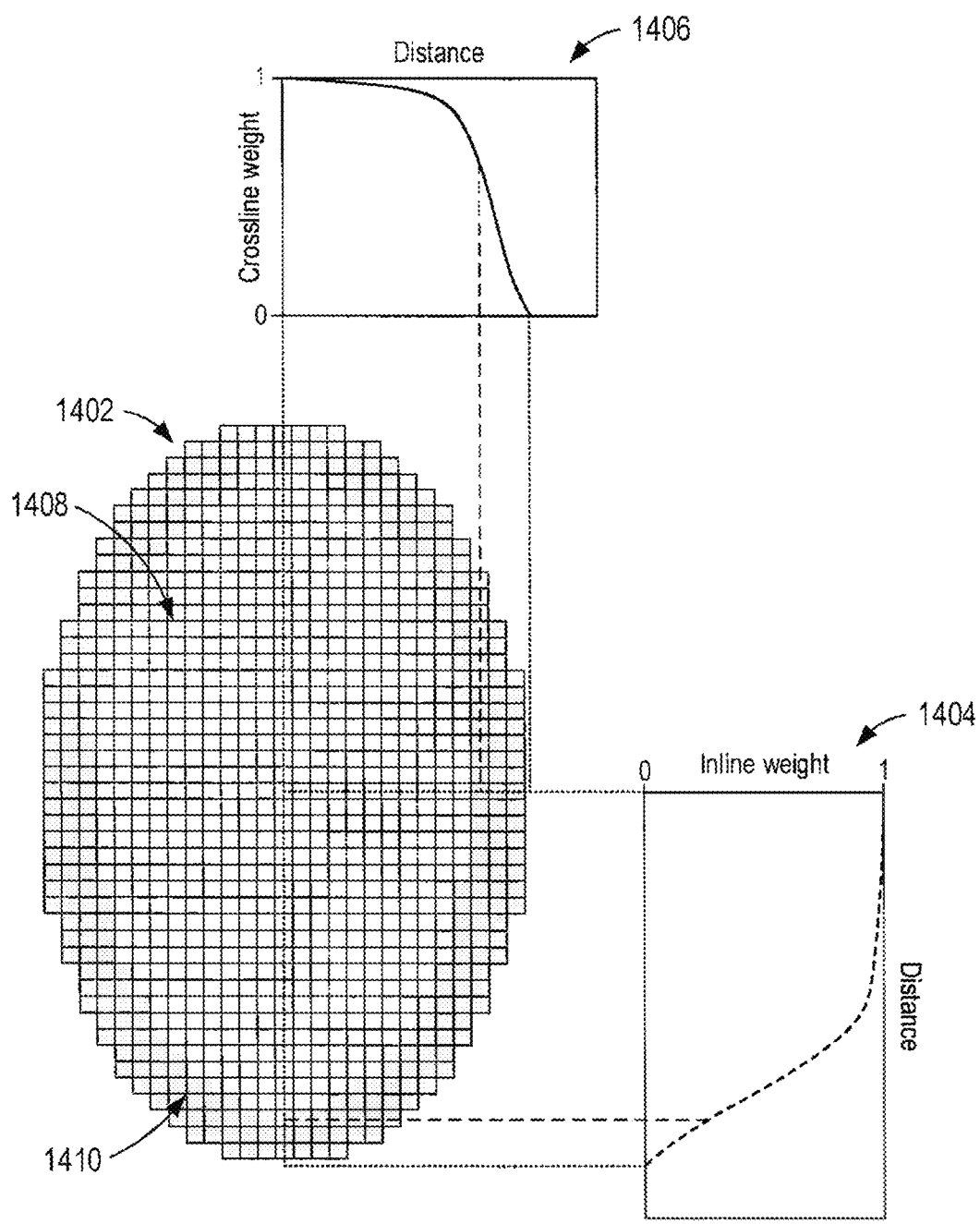
FIG. 14 shows an example of trimming a Fresnel zone.

FIG. 14 shows an example of a trimmed Fresnel zone 1402 centered at a non-zero source/receiver offset and depth. FIG. 14 includes a plot of inline Fresnel weights 1404 and a plot of crossline Fresnel weights 1406 associated with the Fresnel zone. Unshaded region 1408 represents an inner region of the Fresnel zone. Shaded region 1410 represents an outer region of the Fresnel zone where the Fresnel weights decrease and flatten computation of the coverage values in Equations (5a) and (5b). The selected percentage of the Fresnel zone used to compute the coverage values in Equations (5a) and (5b) corresponds to the inner region 1408 and is called the trimmed Fresnel zone. Shaded annular region 1410 of the Fresnel zone 1402 corresponds to Fresnel weights and CMP folds that are omitted from computing the coverage values in Equations (5a) and (5b). In other words, the coverage values in Equations (5a) and (5b) are computed using only the CMP folds and Fresnel weights associated with the trimmed Fresnel zone in the inner region 1410 of the Fresnel zone 1402.

An acceptability map is an image of an area covered in a marine survey. An acceptability map may be created by coloring each of the CMP bins of the CMP fold map with one of three shades of a neutral color gray. One shade represents an acceptable bin, a second shade represents a borderline bin, and a third shade represents an unacceptable bin. For example, in one implementation, a borderline bin may have a light shade, an unacceptable bin may have dark shade, and an acceptable bin may have a medium shade between light and dark. In another implementation, an acceptability map may be created by shading each of the CMP bins of the CMP fold map with one of three colors selected to represent an acceptable bin, a borderline bin, and an unacceptable bin. For example, a borderline bin may be colored yellow, an unacceptable bin may be colored red, and an acceptable bin may be colored green.

Figure 15A:
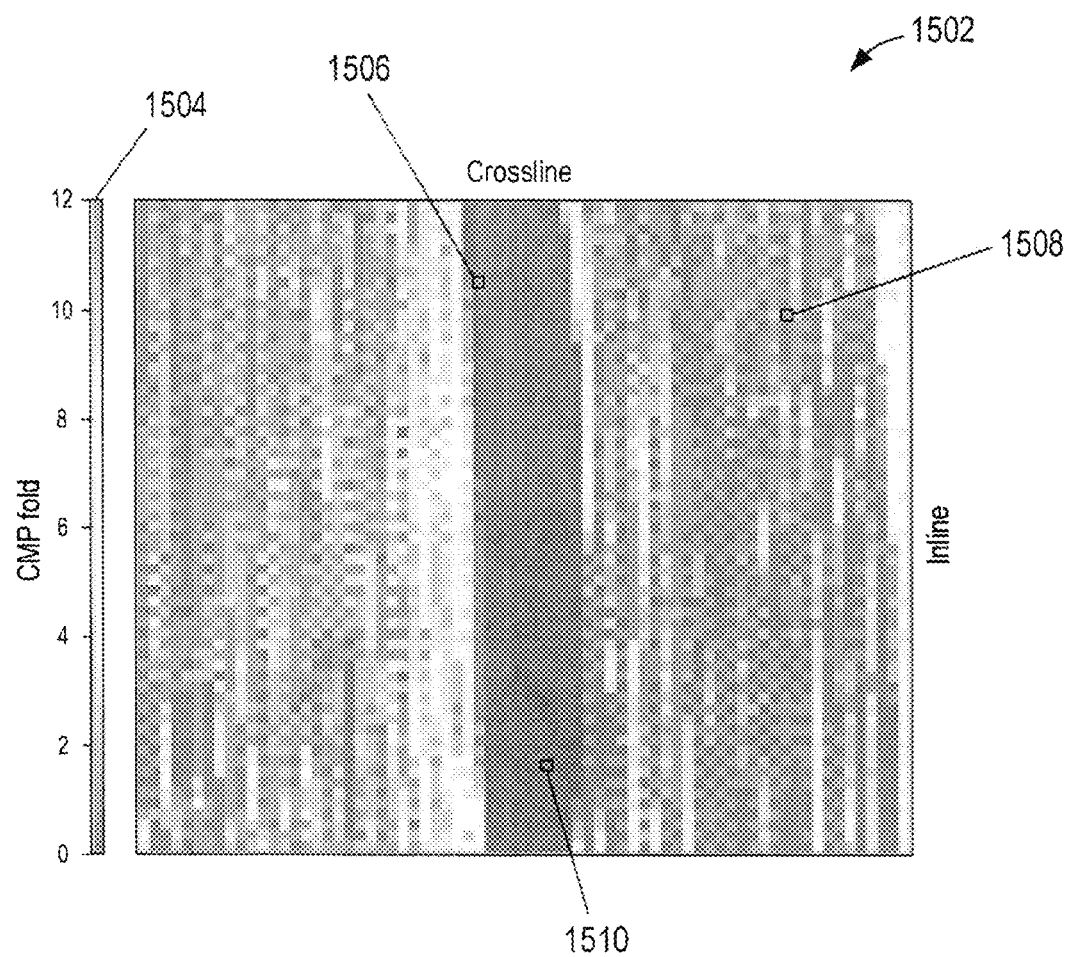
FIGS. 15A-15D show an example of forming an acceptability map from a CMP fold map.

FIGS. 15A-15D show an example of forming an acceptability map from a CMP fold map. FIG. 15A shows an example CMP fold map 1502 partitioned into CMP bins. Each CMP bin is shaded to represent a corresponding CMP fold. The fold associated with each CMP bin corresponds to a shade of a gray color scale of CMP fold values 1504. For example, CMP bin 1506 has a corresponding fold of 6, CMP bin 1508 has a corresponding fold of 11, and CMP bin 1510 has a fold of zero. Port and starboard coverage values are computed for each of the CMP bins of the CMP fold map 1502 using a port and starboard Fresnel sum operators given in Equations (5a) and (5b).

Figure 15B:
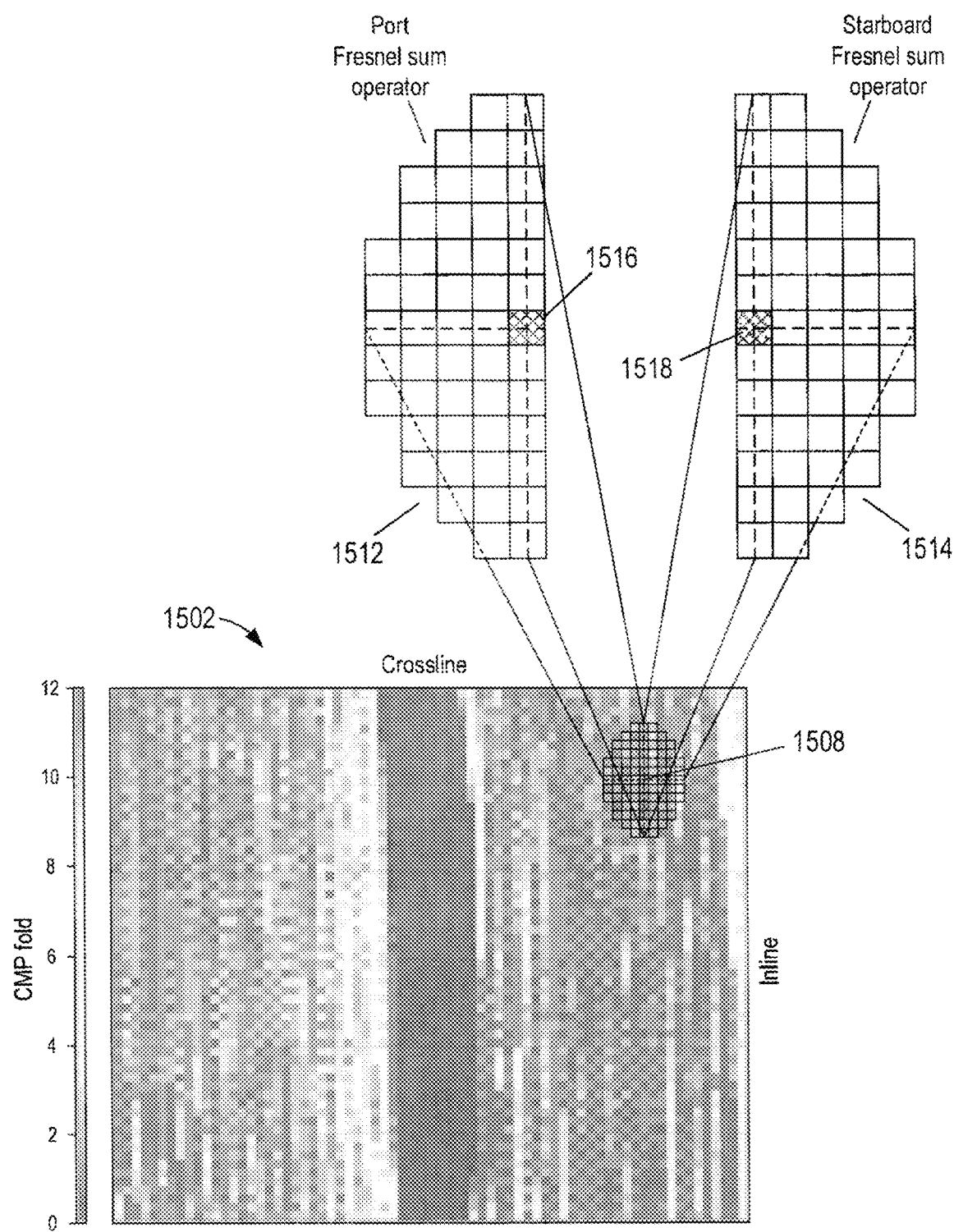

FIG. 15B shows an example of port and starboard Fresnel sum operators 1512 and 1514 centered on the CMP bin 1508. In this example, Fresnel zone bins 1516 and 1518 of the corresponding port and starboard Fresnel sum operators 1512 and 1514 are centered on the CMP bin 1508.

Figure 15C:
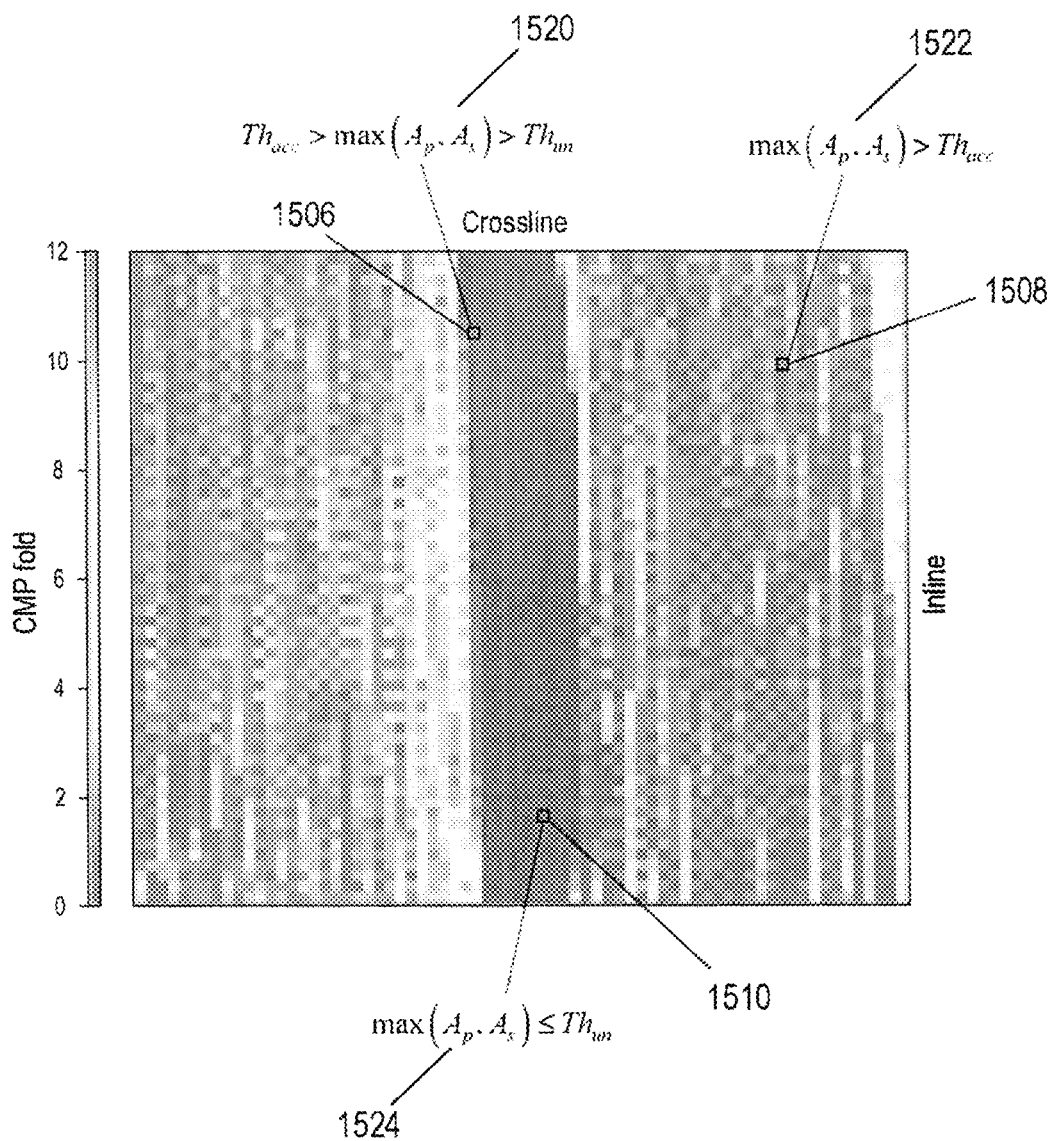

FIG. 15C shows an example of port and starboard coverage values associated with the CMP bins 1506, 1508, and 1510 and hypothetical conditions for identifying the CMP bins as acceptable bins, borderline bins, or unacceptable bins. The port and starboard coverage values of the CMP bin 1506 satisfy the conditions 1520, which correspond to the condition in Equation (7). As a result, the CMP bin 1506 is a borderline bin. The port and starboard coverage values of the CMP bin 1508 satisfy the conditions 1522, which correspond to the condition in Equation (6). As a result, the CMP bin 1508 is an acceptable bin. The port and starboard coverage values of the CMP bin 1510 satisfy the condition 1524, which corresponds to the condition in Equation (8). As a result, the CMP bin 1510 is an unacceptable bin.

Figure 15D:
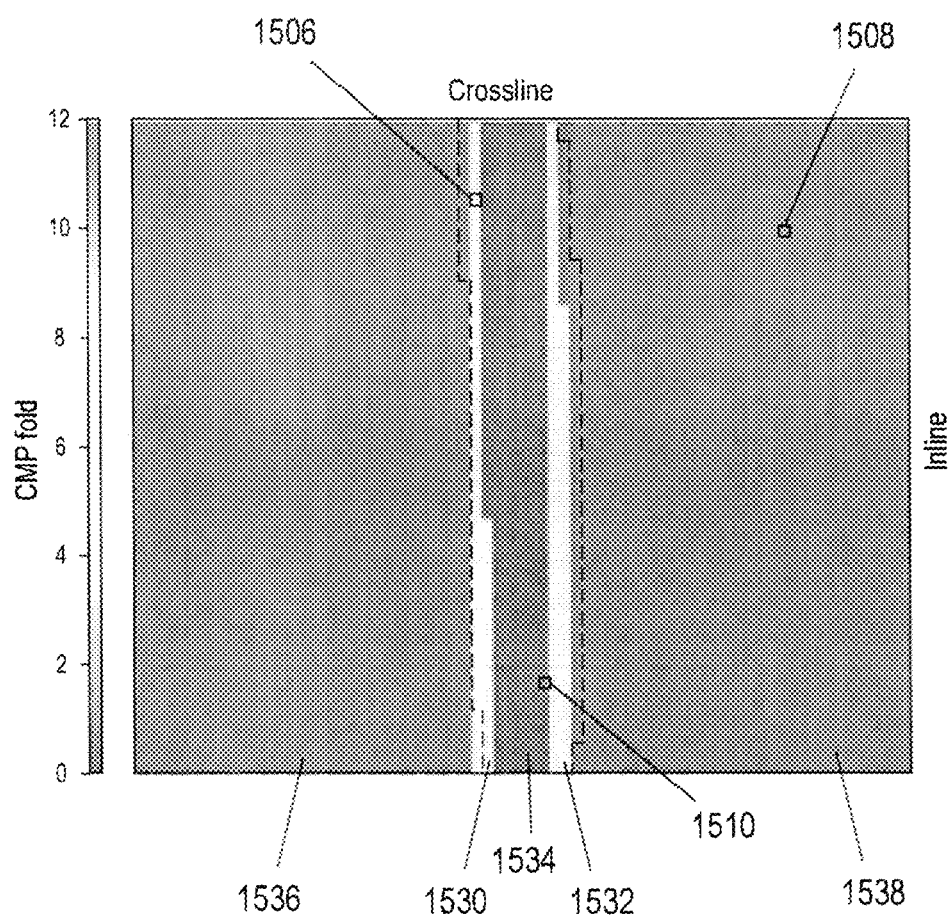

FIG. 15D shows an acceptability map obtained from the CMP fold map 1502. Light shaded regions 1530 and 1532 comprise borderline bins. Dark shaded region 1534 comprises unacceptable bins. Medium shaded regions 1536 and 1538 comprise acceptable bins. For example, bin 1506 is a borderline bin, bin 1508 is an acceptable bin, and bin 1510 is an unacceptable bin.

An acceptability map may be generated as described above on board a survey vessel or at an onshore facility. The acceptability map is used by geoscientist to determine areas of a surveyed area in need of infill. For example, geoscientists viewing the acceptability map shown in FIG. 15D may decide to infill the unacceptable region 1534 by resurveying the corresponding areas of the survey area.

After an acceptability map is computed as described above, the acceptability map may be edited to reset certain clusters of borderline bins to acceptable bins, thereby improving visual interpretation of the acceptability map and avoid the high cost of unnecessarily infilling areas. Methods and systems for editing an acceptability map include applying a clustering algorithm, such as the union find clustering algorithm, to the acceptability map to identify contiguous clusters of acceptable, borderline, and unacceptable bins. The union find clustering algorithm is described in "An improved equivalence algorithm," by Bernard A. Galler and Michael J. Fischer, Communications of the ACM. 7(5): 301-303, which is herein incorporated by reference. For each cluster of borderline bins, if the cluster does not include a bin that is closer to an unacceptable bin threshold than to an acceptable bin threshold, the cluster of borderline bins are reset to acceptable bins. For example, a bin is closer to an unacceptable bin than to an acceptable bin if $\max(A_p, A_s) - Th_{un} < Th_{acc} - \max(A_p, A_s)$. If the cluster of borderline bins has fewer bins than the Fresnel zone bins of the Fresnel zone (i.e., total number of Fresnel zone bins in the Fresnel sum operator), then the cluster of borderline bins are reset to acceptable bins, unless the cluster includes a bin located close to an unacceptable bin. A cluster of borderline bins is reset to acceptable if the number of bins in the cluster satisfies the following condition:

$$NumClusterBins < \frac{NumFZBins \times (A_{min} - Th_{un})}{Th_{acc} - Th_{un}} \quad (9)$$

where

NumClusterBins is the number of borderline bins in the cluster;

NumFZBins is the number of Fresnel zone bins in the Fresnel zone; and $A_{min}$ is the minimum of $A_p$ or $A_s$ for the cluster of borderline bins.

Clusters containing unacceptable bins are not reset. By resetting clusters of borderline bins to acceptable bins, geoscientist avoid the added cost of unnecessarily infilling areas where there is already sufficient recorded seismic data. After cluster editing, geoscientist may then focus their attention on deciding which larger areas identified as borderline and unacceptable bins in an acceptability map are in need of infill. For example, geoscientist may infill the survey area that corresponds to the unacceptable bins in the acceptability map.

Figure 16A:
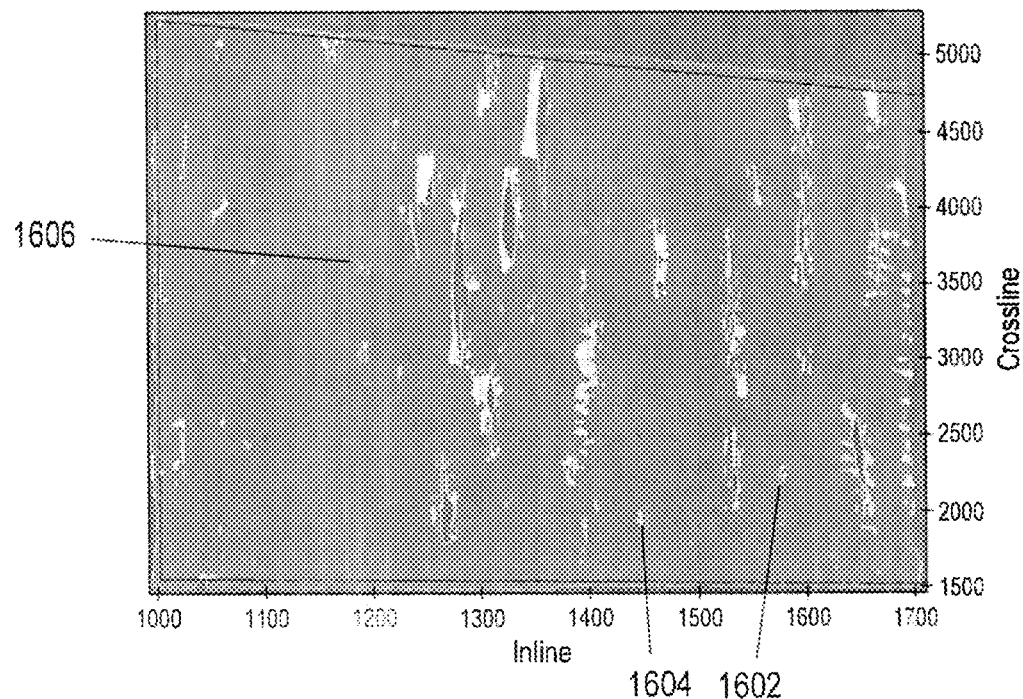
FIGS. 16A-16B show an example of cluster editing applied to an acceptability map.
Figure 16B:
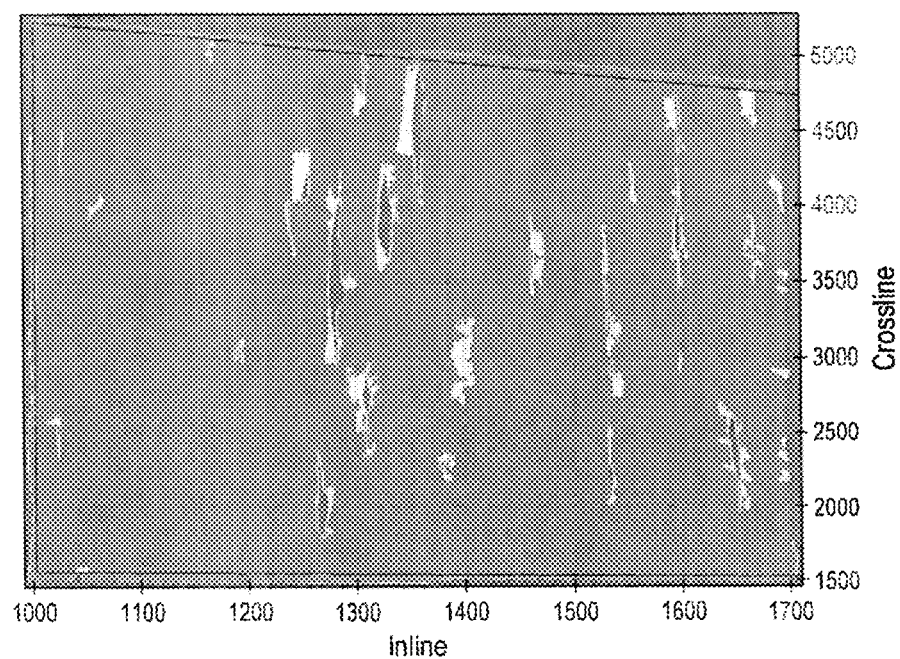

FIG. 16A shows an example of an acceptability map with clusters of borderline bins. Light, medium and dark shaded regions represent borderline, acceptable and unacceptable bins, respectively, as described above with reference to FIG. 13D. The acceptability map shows clusters of borderline bins, such as bins 1602, 1604, and 1606. FIG. 16B shows the acceptability map shown in FIG. 16A after cluster editing. Comparing FIG. 16B to FIG. 16A reveals that cluster editing has reset numerous clusters of borderline bins in FIG. 16A to acceptable bins, resulting in an improved acceptability map with the distraction of clusters of borderline bins removed. Geoscientists viewing the acceptability map shown in FIG. 16B may decide to infill the unacceptable regions by resurveying the corresponding areas of the survey area.

Figure 17:
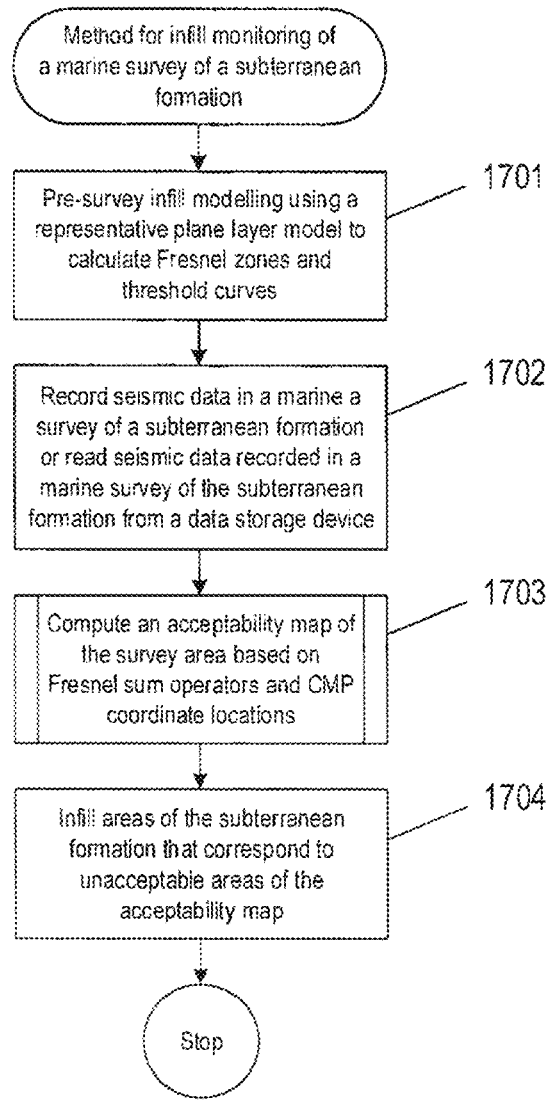
FIG. 17 is a flow diagram illustrating an example method for infill monitoring of a marine survey of a subterranean formation.

FIG. 17 is a flow diagram illustrating an example method for infill monitoring of a marine survey of a subterranean formation. In block 1701, Fresnel zones and threshold curves are calculated for a plane layer model of the subterranean formation as described above with reference to FIG. 6-8. The Fresnel zones and threshold curves may be computed prior to or after the marine survey of the subterranean formation. In block 1702, CMP locations are computed for seismic data recorded in the marine survey of a subterranean formation. The seismic data may have been recorded in a marine survey of the subterranean formation following calculation of the Fresnel zones and threshold curves or the seismic data may have been recorded prior to calculation of the Fresnel zones and threshold curves. In block 1703, a "compute an acceptability map of the survey area based on Fresnel sum operators and CMP coordinate locations" procedure is performed. An example implementation of the "compute an acceptability map of the survey area based on Fresnel sum operators and CMP coordinate locations" procedure is described below with reference to FIG. 18. In block 1704, areas of the subterranean formation that correspond to unacceptable areas of the acceptability map are infilled.

Figure 18:
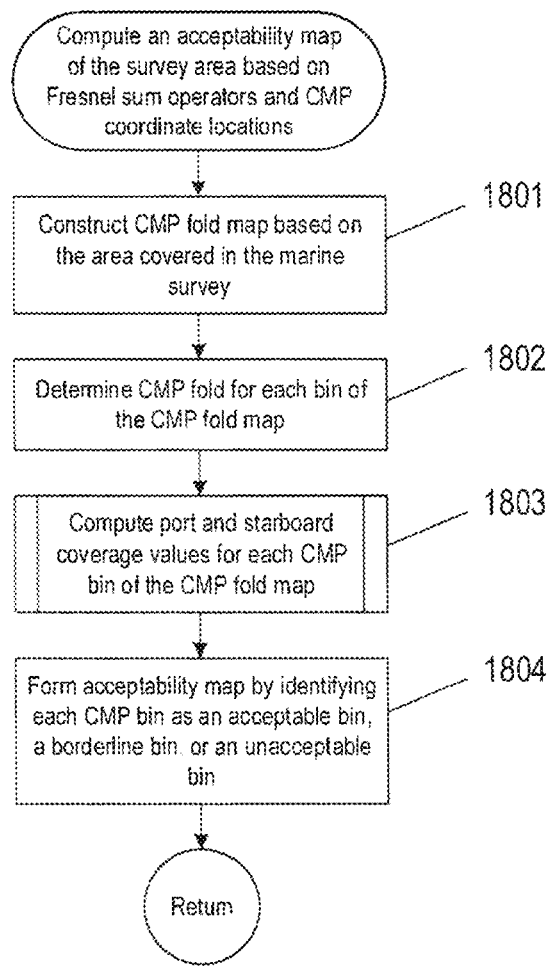
FIG. 18 is a flow diagram illustrating an example implementation of the "compute an acceptability map of the survey area based on the Fresnel sum operators and CMP coordinate locations" procedure performed in FIG. 17.

FIG. 18 is a flow diagram illustrating an example implementation of the "compute an acceptability map of the survey area based on the Fresnel sum operators and CMP coordinate locations" procedure performed in block 1703 of FIG. 17. In block 1801, a CMP fold map is constructed based on the area covered in the marine survey as described above with reference to FIG. 9. In block 1802, a CMP fold is determined for each CMP bin of the CMP fold map. In block 1803, a "compute port and starboard coverage values for each CMP bin of the CMP fold map" procedure is performed. An example implementation of the "compute port and starboard coverage values for each CMP bin of the CMP fold map" procedure is described below with reference to FIG. 19. In block 1804, an acceptability map is formed by identifying each CMP bin of the CMP fold map as an acceptable bin, a borderline bin, or an unacceptable bin.

Figure 19:
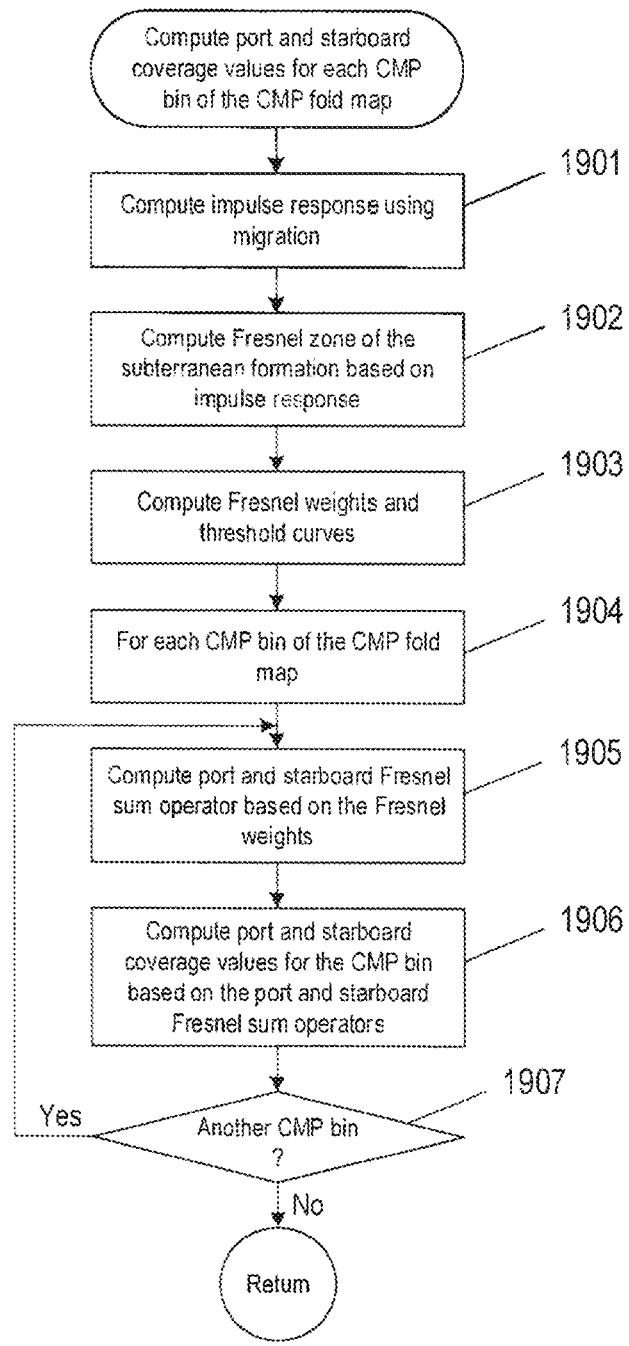
FIG. 19 is a flow diagram illustrating an example implementation of the "compute port and starboard coverage values for each CMP bin of the CMP fold map" procedure performed in FIG. 18.

FIG. 19 is a flow diagram illustrating an example implementation of the "compute port and starboard coverage values for each CMP bin of the CMP fold map" procedure performed in block 1803 of FIG. 18. In block 1901, an impulse response is computed using migration. In block 1902, a Fresnel zone of the subterranean formation is computed based on the impulse response. In block 1903, Fresnel weights and threshold curves are computed. A loop beginning with block 1904 repeats the computational operations represented by blocks 1905-1906 for each CMP bin of the CMP fold map. In block 1905, port and starboard Fresnel sum operators are computed based on the Fresnel sum operator and the CMP fold of the CMP bin as described above with reference to FIGS. 9-11. In block 1906, port and starboard coverage values are computed for the CMP bin based on the port and starboard Fresnel sum operator as described above with reference to FIG. 14. In decision block 1907, the computational operations represented by blocks 1905 and 1906 are repeated for another CMP bin.

Figure 20:
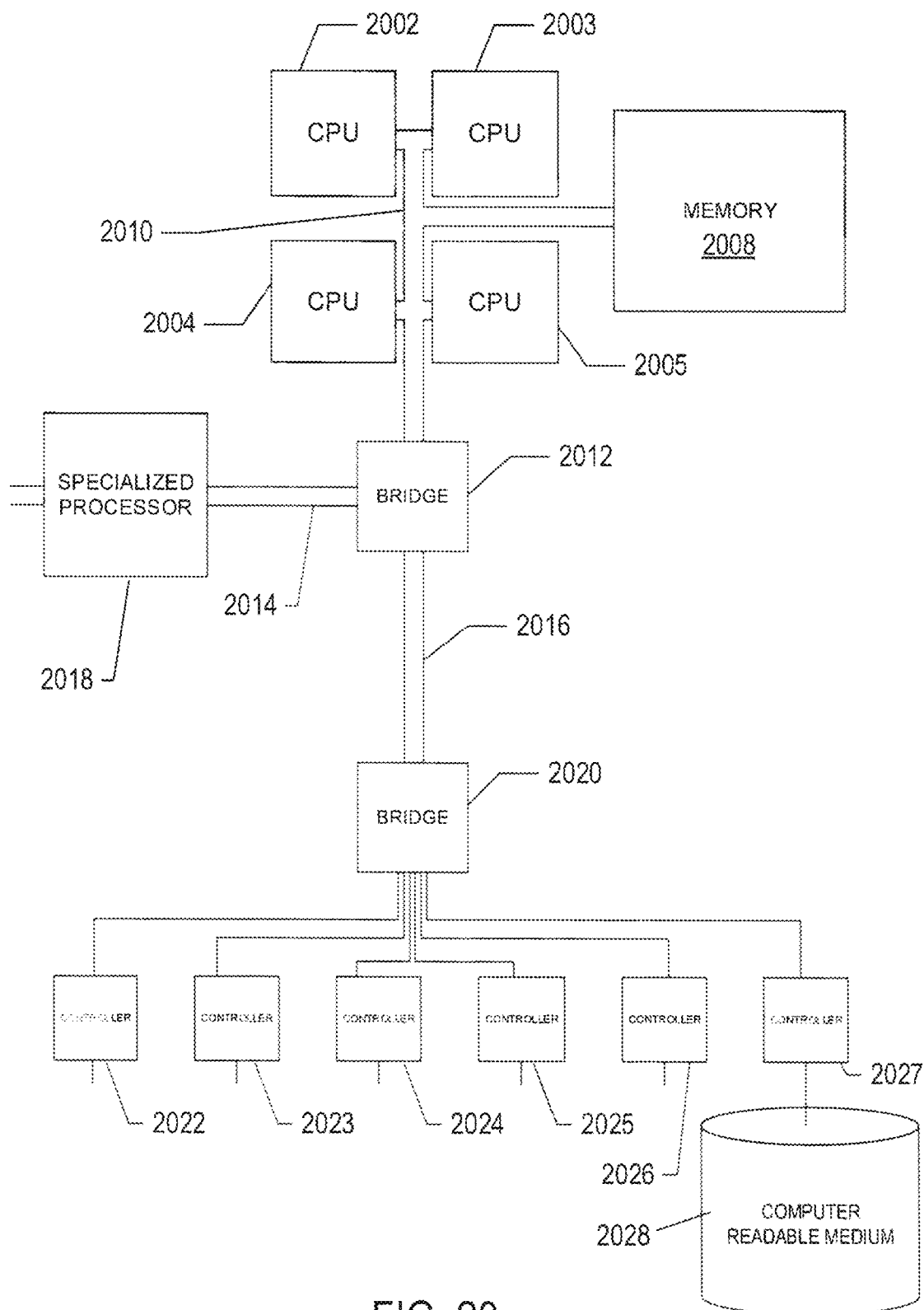
FIG. 20 shows an example of a computer system that may be used to execute an efficient process for generating an acceptability map of seismic data recorded over a surface are in a marine survey of a subterranean formation in accordance with embodiments, and therefore represents a geophysical-analysis system.

FIG. 20 shows an example of a computer system that may be used to execute efficient processes for generating an acceptability map of subterranean formation in accordance with embodiments described herein, and therefore represents a geophysical-analysis system. The internal components of many small, mid-sized, and large computer systems as well as specialized processor-based storage systems can be described with respect to this generalized architecture, although each system may feature many additional components, subsystems, and similar, parallel systems with architectures similar to this generalized architecture. The computer system contains one or multiple central processing units ("CPUs") 2002-2005, one or more electronic memories 2008 interconnected with the CPUs by a CPU/memory-subsystem bus 2010 or multiple busses, a first bridge 2012 that interconnects the CPU/memory-subsystem bus 2010 with additional busses 2014 and 2016, or other types of high-speed interconnection media, including multiple, high-speed serial interconnects. The busses or serial interconnections, in turn, connect the CPUs and memory with specialized processors, such as a graphics processor 2018, and with one or more additional bridges 2020, which are interconnected with high-speed serial links or with multiple controllers 2122-2127, such as controller 2027, that provide access to various different types of computer-readable media, such as computer-readable medium 2028, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 2028 is a data-storage device and may include, for example, electronic memory, optical or magnetic disk drive, USB drive, flash memory and other such data-storage devices. The computer-readable medium 2028 can be used to store machine-readable instructions that encode the computational processes described above and can be used to store encoded data, during store operations, and from which encoded data can be retrieved, during read operations, by computer systems, data-storage systems, and peripheral devices.

The processes and systems disclosed herein may be used to form a geophysical data product indicative of certain properties of a subterranean formation. The geophysical data product may be manufactured by using the processes and systems described herein to generate geophysical data and storing the geophysical data in the computer readable medium 2028. The geophysical data product may include geophysical data such as pressure data, particle motion data, particle velocity data, particle acceleration data, CMP fold map, an acceptability map, and any seismic image of a subterranean formation computed from using the processes and systems described herein. The geophysical data product may be produced offshore (i.e., by equipment on the survey vessel 102) or onshore (i.e., at a computing facility on land), or both.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method for infill monitoring a marine survey of a subterranean formation using a survey vessel that tows a source and multiple receivers to record seismic data in a survey area above the subterranean formation, the method comprising:

computing Fresnel sum operators based on a plane layer model of the subterranean formation;

constructing a common-midpoint ("CMP") fold map of the survey area based on coordinate locations of the source and coordinate locations of the multiple receivers in the survey area;

computing an acceptability map of the survey area based on the Fresnel sum operators and the CMP fold map, the acceptability map revealing unacceptable coverage gaps in the survey area; and infilling coverage gaps that correspond to the unacceptable coverage gaps in the acceptability map.

2. The method of claim 1 wherein computing the Fresnel sum operators comprises:
  computing impulse responses for different source/receiver offsets and depths of the plane layer model;
  computing the Fresnel sum operators for each of the impulse responses, each of the Fresnel sum operators corresponding to the different source/receiver offsets and depths of the plane layer model; and
  for each Fresnel sum operator of the Fresnel sum operators, forming a port Fresnel sum operator and a starboard Fresnel sum operator.

3. The method of claim 1 wherein computing the Fresnel sum operators comprises:
  for each source/receiver offset range of the plane layer model
    computing an impulse response using Kirchhoff migration,
    computing a Fresnel zone of the subterranean formation based on the impulse response, and
    computing Fresnel weights of the Fresnel zone.

4. The method of claim 1 wherein computing the acceptability map of the survey area based on the Fresnel sum operators comprises:
  partitioning the CMP fold map in CMP bins;
  determining a CMP fold for each CMP bin of the CMP fold map;
  dividing each Fresnel sum operator of the Fresnel sum operators into a port Fresnel sum operator and a starboard Fresnel sum operator;
  computing a port coverage value and a starboard coverage value for each CMP bin of the CMP fold map based on the port Fresnel sum operator and the starboard Fresnel sum operator associated with the CMP bin; and
  identifying each CMP bin of the CMP fold map as an acceptable bin, borderline bin, or an unacceptable bin based the port coverage value and the starboard coverage value associated with the CMP bin.

5. The method of claim 1 wherein computing the acceptability map of the survey area based on the Fresnel sum operators comprises:
  partitioning the CMP fold map into CMP bins;
  determining a CMP fold for each CMP bin of the CMP fold map;
  for each CMP bin of the CMP fold map,
    computing a port Fresnel sum operator and a starboard Fresnel sum operator based on Fresnel weights and the CMP fold of the CMP bin, and
    computing a port coverage value and a starboard coverage value for the CMP bin based on the port Fresnel sum operator and the starboard Fresnel sum operator; and
  identifying each CMP bin of the CMP fold map as an acceptable bin, a borderline bin, or an unacceptable bin based on the port coverage value and the starboard coverage value associated with the CMP bin.

6. The method of claim 1 wherein computing the acceptability map of the survey area based on Fresnel sum operators of the subterranean formation comprises trimming the Fresnel sum operators.

7. The method of claim 1 further comprising:
  identifying contiguous clusters of borderline bins; and
  for each of the clusters of borderline bins, if a cluster of borderline bins does not include a bin that is closer to an unacceptable bin threshold than to an acceptable bin threshold, resetting the cluster of borderline bins to acceptable bins.

8. In a computer-implemented process for generating an acceptability map of a survey area covered in a marine survey of a subterranean formation using marine seismic techniques in which a source is activated above the subterranean formation and reflections from the subterranean formation are recorded as data generated by multiple receivers, the improvement comprising:
  computing Fresnel sum operators based on a plane layer model of the subterranean formation;
  constructing a common-midpoint ("CMP") fold map of the survey area based on coordinate locations of the source and coordinate locations of the multiple receivers in the survey area;
  applying the Fresnel sum operators to the CMP fold map to produce the acceptability map that identifies areas within the survey area as acceptable, borderline, or unacceptable; and
  displaying the acceptability map as an image, thereby revealing locations of acceptable and borderline areas of the survey area and unacceptable areas that correspond to coverage gaps in the seismic data recorded in the survey area.

9. The process of claim 8 wherein computing the Fresnel sum operators comprises:
  computing impulse responses for different source/receiver offsets and depths of the plane layer model;
  computing the Fresnel sum operators for each of the impulse response responses, the Fresnel sum operators corresponding to the different source/receiver offsets and depths of the plane layer model; and
  for each Fresnel sum operator of the Fresnel sum operators, forming a port Fresnel sum operator and a starboard Fresnel sum operator.

10. The process of claim 8 wherein computing the Fresnel sum operators comprises:
  for each source/receiver offset range of the plane layer model
    computing an impulse response using Kirchhoff migration,
    computing a Fresnel zone of the subterranean formation based on the impulse response, and
    computing Fresnel weights of the Fresnel zone.

11. The process of claim 8 wherein applying the Fresnel sum operators to the CMP fold map to produce the acceptability map comprises:
  partitioning the CMP fold map in CMP bins;
  determining a CMP fold for each CMP bin of the CMP fold map;
  dividing each Fresnel sum operator of the Fresnel sum operators into a port Fresnel sum operator and a starboard Fresnel sum operator;
  computing a port coverage value and a starboard coverage value for each CMP bin of the CMP fold map based on the port Fresnel sum operator and the starboard Fresnel sum operator associated with the CMP bin; and identifying each CMP bin of the CMP fold map as an acceptable bin, borderline bin, or an unacceptable bin based the port coverage value and the starboard coverage value associated with the CMP bin.

12. The process of claim 8 wherein applying the Fresnel sum operators to the CMP fold map to produce the acceptability map comprises:
    partitioning the CMP fold map into CMP bins;
    determining a CMP fold for each CMP bin of the CMP fold map;
    for each CMP bin of the CMP fold map,
        computing a port Fresnel sum operator and a starboard Fresnel sum operator based on Fresnel weights and the CMP fold of the CMP bin, and
        computing a port coverage value and a starboard coverage value for the CMP bin based on the port Fresnel sum operator and the starboard Fresnel sum operator; and
    identifying each CMP bin of the CMP fold map as an acceptable bin, a borderline bin, or an unacceptable bin based on the port coverage value and the starboard coverage value associated with the CMP bin.

13. The process of claim 8 wherein applying the Fresnel sum operators to the CMP fold map comprises trimming the Fresnel sum operators.

14. The process of claim 8 further comprising:
    identifying contiguous clusters of borderline bins; and
    for each of the clusters of borderline bins, if a cluster of borderline bins does not include a bin that is closer to an unacceptable bin threshold than to an acceptable bin threshold, resetting the cluster of borderline bins to acceptable bins.

15. A computer system for generating an acceptability map of a survey area covered in a marine survey of a subterranean formation, the system comprising:
    one or more processors;
    one or more data-storage devices; and
    machine-readable instructions stored in the one or more data-storage devices that when executed using the one or more processors perform operations comprising:
        computing Fresnel sum operators based on a plane layer model of the subterranean formation;
        constructing a common-midpoint ("CMP") fold map of the survey area based on coordinate locations of a source and coordinate locations of multiple receivers in the survey area; and
        applying the Fresnel sum operators to the CMP fold map to produce the acceptability map of the survey area, wherein the acceptability map is an image that reveals locations of acceptable and borderline areas of the survey area and unacceptable areas that correspond to coverage gaps in the seismic data recorded in the survey area.

16. The computer system of claim 15 wherein computing the Fresnel sum operators comprises:
    computing impulse responses for different source/receiver offsets and depths of the plane layer model;
    computing the Fresnel sum operators for each of the impulse responses, each of the Fresnel sum operators corresponding to the different source/receiver offsets and depths of the plane layer model; and
    for each Fresnel sum operator of the Fresnel sum operators, forming a port Fresnel sum operator and a starboard Fresnel sum operator.

17. The computer system of claim 15 wherein computing the Fresnel sum operators comprises:
    for each source/receiver offset range of the plane layer model
        computing an impulse response using Kirchhoff migration,
        computing a Fresnel zone of the subterranean formation based on the impulse response, and
        computing Fresnel weights of the Fresnel zone.

18. The computer system of claim 15 wherein applying the Fresnel sum operators to the CMP fold map to produce the acceptability map comprises:
    partitioning the CMP fold map in CMP bins;
    determining a CMP fold for each CMP bin of the CMP fold map;
    dividing each Fresnel sum operator of the Fresnel sum operators into a port Fresnel sum operator and a starboard Fresnel sum operator;
    computing a port coverage value and a starboard coverage value for each CMP bin of the CMP fold map based on the port Fresnel sum operator and the starboard Fresnel sum operator associated with the CMP bin; and
    identifying each CMP bin of the CMP fold map as an acceptable bin, borderline bin, or an unacceptable bin based the port coverage value and the starboard coverage value associated with the CMP bin.

19. The computer system of claim 15 wherein applying the Fresnel sum operators to the CMP fold map to produce the acceptability map comprises:
    partitioning the CMP fold map into CMP bins;
    determining a CMP fold for each CMP bin of the CMP fold map;
    for each CMP bin of the CMP fold map,
        computing a port Fresnel sum operator and a starboard Fresnel sum operator based on Fresnel weights and the CMP fold of the CMP bin, and
        computing a port coverage value and a starboard coverage value for the CMP bin based on the port Fresnel sum operator and the starboard Fresnel sum operator; and
    identifying each CMP bin of the CMP fold map as an acceptable bin, a borderline bin, or an unacceptable bin based on the port coverage value and the starboard coverage value associated with the CMP bin.

20. The computer system of claim 15 wherein applying the Fresnel sum operators to the CMP fold map to produce the acceptability map comprises trimming the Fresnel sum operators.

21. The computer system of claim 15, the operations further comprising
    identifying contiguous clusters of borderline bins; and
    for each of the clusters of borderline bins, if a cluster of borderline bins does not include a bin that is closer to an unacceptable bin threshold than to an acceptable bin threshold, resetting the cluster of borderline bins to acceptable bins.

22. A non-transitory computer-readable medium encoded with machine-readable instructions that implement a method for generating an acceptability map of a survey area covered in a marine survey of a subterranean formation, the method executed by one or more processors of a computer system that performs operations comprising:
    computing Fresnel sum operators based on a plane layer model of the subterranean formation;
    constructing a common-midpoint ("CMP") fold map of the survey area based on coordinate locations of a source and coordinate locations of multiple receivers in the survey area; and applying the Fresnel sum operators to the CMP fold map to produce the acceptability map of the survey area, wherein the acceptability map is an image that reveals locations of acceptable and borderline areas of the survey area and unacceptable areas that correspond to coverage gaps in the seismic data recorded in the survey area.

23. The medium of claim 22 wherein computing the Fresnel sum operators comprises:
computing impulse responses for different source/receiver offsets and depths of the plane layer model;
computing the Fresnel sum operators for each of the impulse responses, each of the Fresnel sum operators corresponding to the different source/receiver offsets and depths of the plane layer model; and
for each Fresnel sum operator of the Fresnel sum operators, forming a port Fresnel sum operator and a starboard Fresnel sum operator.

24. The medium of claim 22 wherein computing the Fresnel sum operators comprises:
for each source/receiver offset range of the plane layer model
computing an impulse response using Kirchhoff migration,
computing a Fresnel zone of the subterranean formation based on the impulse response, and
computing Fresnel weights of the Fresnel zone.

25. The medium of claim 22 wherein applying the Fresnel sum operators to the CMP fold map to produce the acceptability map of the survey area comprises:
partitioning the CMP fold map in CMP bins;
determining a CMP fold for each CMP bin of the CMP fold map;
dividing each Fresnel sum operator of the Fresnel sum operators into a port Fresnel sum operator and a starboard Fresnel sum operator;
computing a port coverage value and a starboard coverage value for each CMP bin of the CMP fold map based on the port Fresnel sum operator and the starboard Fresnel sum operator associated with the CMP bin; and
identifying each CMP bin of the CMP fold map as an acceptable bin, borderline bin, or an unacceptable bin based the port coverage value and the starboard coverage value associated with the CMP bin.

26. The medium of claim 22 wherein applying the Fresnel sum operators to the CMP fold map to produce the acceptability map of the survey area comprises:
partitioning the CMP fold map into CMP bins;
determining a CMP fold for each CMP bin of the CMP fold map;
for each CMP bin of the CMP fold map,
computing a port Fresnel sum operator and a starboard Fresnel sum operator based on Fresnel weights and the CMP fold of the CMP bin, and
computing a port coverage value and a starboard coverage value for the CMP bin based on the port Fresnel sum operator and the starboard Fresnel sum operator; and
identifying each CMP bin of the CMP fold map as an acceptable bin, a borderline bin, or an unacceptable bin based on the port coverage value and the starboard coverage value associated with the CMP bin.

27. The medium of claim 22 wherein applying the Fresnel sum operators to the CMP fold map to produce the acceptability map of the survey area comprises trimming the Fresnel sum operators.

28. The medium of claim 22, the operations further comprising:
identifying contiguous clusters of borderline bins; and
for each of the clusters of borderline bins, if a cluster of borderline bins does not include a bin that is closer to an unacceptable bin threshold than to an acceptable bin threshold, resetting the cluster of borderline bins to acceptable bins.

29. Apparatus for generating an acceptability map of a survey area covered in a marine survey of a subterranean formation, the apparatus comprising:
means for computing Fresnel sum operators based on a plane layer model of the subterranean formation;
means for constructing a common-midpoint ("CMP") fold map of the survey area based on coordinate locations of a source and coordinate locations of multiple receivers in a survey area; and
means for applying the Fresnel sum operators to the CMP fold map to produce the acceptability map of the survey area, wherein the acceptability map is an image that reveals locations of acceptable and borderline areas of the survey area and unacceptable areas that correspond to coverage gaps in the seismic data recorded in the survey area.

30. The apparatus of claim 29 wherein the means for computing the Fresnel sum operators:
computes impulse responses for different source/receiver offsets and depths of the plane layer model;
computes the Fresnel sum operators for each of the impulse responses, each of the Fresnel sum operators corresponding to the different source/receiver offsets and depths of the plane layer model; and for each Fresnel sum operator of the Fresnel sum operators, forms a port Fresnel sum operator and a starboard Fresnel sum operator.

31. The apparatus of claim 29 wherein the means for computing the Fresnel sum operators:
computes an impulse response using Kirchhoff migration for each source/receiver offset range of the plane layer model,
computes a Fresnel zone of the subterranean formation based on the impulse response for each source/receiver offset range of the plane layer model, and
computes Fresnel weights of the Fresnel zone for each source/receiver offset range of the plane layer model.

32. The apparatus of claim 29 wherein the means for applying the Fresnel sum operators to the CMP fold map to produce the acceptability map:
partitions the CMP fold map in CMP bins;
determines a CMP fold for each CMP bin of the CMP fold map;
divides each Fresnel sum operator of the Fresnel sum operators into a port Fresnel sum operator and a starboard Fresnel sum operator;
computes a port coverage value and a starboard coverage value for each CMP bin of the CMP fold map based on the port Fresnel sum operator and the starboard Fresnel sum operator associated with the CMP bin; and
identifies each CMP bin of the CMP fold map as an acceptable bin, borderline bin, or an unacceptable bin based the port coverage value and the starboard coverage value associated with the CMP bin.

33. The apparatus of claim 29 wherein the means for applying the Fresnel sum operators to the CMP fold map to produce the acceptability map:

partitions the CMP fold map into CMP bins;
determines a CMP fold for each CMP bin of the CMP fold map;
for each CMP bin of the CMP fold map,
  computes a port Fresnel sum operator and a starboard Fresnel sum operator based on Fresnel weights and the CMP fold of the CMP bin, and
  computes a port coverage value and a starboard coverage value for the CMP bin based on the port Fresnel sum operator and the starboard Fresnel sum operator; and
identifies each CMP bin of the CMP fold map as an acceptable bin, a borderline bin, or an unacceptable bin based on the port coverage value and the starboard coverage value associated with the CMP bin.

34. The apparatus of claim 29 wherein the means for applying the Fresnel sum operators to the CMP fold map to produce the acceptability map trims the Fresnel sum operators.

35. The apparatus of claim 29 further comprising:
means for identifying contiguous clusters of borderline bins; and
for each of the clusters of borderline bins, if a cluster of borderline bins does not include a bin that is closer to an unacceptable bin threshold than to an acceptable bin threshold, means for resetting the cluster of borderline bins to acceptable bins.

36. A method of manufacturing a geophysical data product, the method comprising:
computing Fresnel sum operators based on a plane layer model of a subterranean formation;
constructing a common-midpoint ("CMP") fold map of a survey area above the subterranean formation based on coordinate locations of a source and coordinate locations of multiple receivers in a marine survey performed in a survey area of the subterranean formation;
computing an acceptability map of the survey area based on the Fresnel sum operators and the CMP fold map;
infilling areas of the survey area that correspond to the unacceptable coverage gaps; and
storing seismic data recorded in the survey area in a computer readable medium.

* * * * *